United States Patent
Sevindik et al.

(10) Patent No.: US 11,533,629 B2
(45) Date of Patent: Dec. 20, 2022

(54) SCHEDULED AMPLIFIER WIRELESS BASE STATION APPARATUS AND METHODS

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 251 days.

(21) Appl. No.: 16/854,689

(22) Filed: Apr. 21, 2020

(65) Prior Publication Data

US 2021/0329467 A1 Oct. 21, 2021

(51) Int. Cl.
| | |
|---|---|
| *H04W 16/14* | (2009.01) |
| *H04W 16/24* | (2009.01) |
| *H04B 7/26* | (2006.01) |
| *H04W 88/08* | (2009.01) |
| *H04B 3/54* | (2006.01) |

(52) U.S. Cl.
CPC ............. *H04W 16/14* (2013.01); *H04B 3/54* (2013.01); *H04B 7/2606* (2013.01); *H04W 16/24* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 7,088,288 B1 * | 8/2006 | Margolese | H01Q 3/2605 455/562.1 |
| 8,515,495 B2 * | 8/2013 | Shang | H01Q 21/205 455/562.1 |
| 10,271,351 B1 | 4/2019 | Wang | |
| 10,980,025 B2 | 4/2021 | Hmimy et al. | |
| 2004/0190479 A1 * | 9/2004 | Deane | H04B 1/18 370/339 |

(Continued)

OTHER PUBLICATIONS

3GPP TS 38.212 V.15.10.0 3rd Generation Partnership Project; Technical Specification Group Radio Access Network; NR; Multiplexing and Channel Coding (Release 15), Sep. 2020.

(Continued)

*Primary Examiner* — Otis L Thompson, Jr.
(74) *Attorney, Agent, or Firm* — Patent Beach PC

(57) ABSTRACT

Apparatus and methods for providing enhanced coverage in a quasi-licensed wireless system using a reduced-cost base station apparatus. In one embodiment, the base station is configured to utilize quasi-licensed 3.55-3.70 GHz CBRS (Citizens Broadband Radio Service) GAA and PAL spectrum, and employs a power amplifier sharing arrangement in its transmitter chain(s), along with multi-sector antenna elements. A scheduling algorithm operative on the base station generates sector-specific weights which are used to allocate the shared power amplifier(s) between the different sectors. Advantageously, design and production costs of the base station are reduced through sharing of comparatively expensive amplifier and transmitter chain components, thereby allowing for commoditization of the base station for mass distribution.

20 Claims, 21 Drawing Sheets

(56) References Cited

U.S. PATENT DOCUMENTS

| | | | |
|---|---|---|---|
| 2004/0196813 A1* | 10/2004 | Ofek | H04B 7/0491 370/278 |
| 2007/0142057 A1* | 6/2007 | Murakami | H04W 24/02 455/452.2 |
| 2008/0125047 A1* | 5/2008 | Li | H04B 7/0491 455/63.1 |
| 2009/0121936 A1* | 5/2009 | Maltsev | H01Q 3/2605 342/373 |
| 2010/0165892 A1* | 7/2010 | Cha | H04W 24/00 370/280 |
| 2012/0014349 A1* | 1/2012 | Chung | H04L 5/0048 370/329 |
| 2012/0129551 A1 | 5/2012 | Islam | |
| 2013/0210491 A1* | 8/2013 | Eriksson | H04B 17/382 455/562.1 |
| 2015/0155921 A1* | 6/2015 | Louzir | H04B 7/0413 370/329 |
| 2015/0358070 A1* | 12/2015 | Ohm | H04B 7/0608 370/329 |
| 2016/0218426 A1* | 7/2016 | Kelly | H01Q 21/28 |
| 2018/0212669 A1* | 7/2018 | Li | H04B 7/0604 |
| 2019/0268051 A1* | 8/2019 | Ho | H04B 7/0682 |
| 2019/0304937 A1* | 10/2019 | Jin | H01L 23/528 |
| 2020/0014693 A1 | 1/2020 | Frederick et al. | |
| 2021/0297109 A1* | 9/2021 | Ono | H03F 3/245 |
| 2021/0313841 A1* | 10/2021 | Johnston | H02J 50/90 |
| 2021/0337391 A1 | 10/2021 | Sevindik et al. | |
| 2022/0171045 A1* | 6/2022 | Johnston | H01Q 3/28 |
| 2022/0232367 A1* | 7/2022 | Gopal | H04W 8/18 |

OTHER PUBLICATIONS

Deering, S., et al., "Internet Protocol, Version 6 (IPv6) Specification," Internet Engineering Task Force (IETF) RFC 2460, Dec. 1998, 39 pages.

"Internet Protocol, DARPA Internet Program, Protocol Specification", IETF RCF 791, Sep. 1981, 50 pages.

Nokia 5G New Radio (NR): Physical Layer Overview and Performance, IEEE Communication Theory Workshop, 2018 by A. Ghosh, May 15, 2018, 38 pages.

* cited by examiner

SCHEDULED AMPLIFIER WIRELESS BASE STATION APPARATUS AND METHODS

RELATED APPLICATIONS

This application is generally related to the subject matter of co-owned and co-pending U.S. Provisional Patent Application Ser. No. 62/873,141 filed Jul. 11, 2019, 2019 and entitled "APPARATUS AND METHODS FOR HETEROGENEOUS COVERAGE AND USE CASES IN A QUASI-LICENSED WIRELESS SYSTEM," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically prioritizing and reassigning radio frequency spectrum and users, such as for example those providing connectivity via quasi-licensed Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |

TABLE 2-continued

| Frequency range | Type | Center frequency | Availability | Licensed users |
|---|---|---|---|---|
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 1a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband Radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Omni- and Multi-Sector Antenna Technology and Related Challenges

Extant CBRS architectures typically use omni-directional antennas. Traditional omni-directional antennas uniformly radiate power in all directions in the horizontal (azimuth) plane. However, this not an effective coverage solution in many cases, due to often limited footprint, and the antenna being prone to interference (thereby degrading overall network performance). Specifically, one disadvantage of using an omni-directional antenna is that the interference is received from all directions which could degrade the system performance.

Alternatively, directional multi-sector antennas are a promising technology in wireless networks. A multi-sector antenna divides a 360 degrees horizontal plane (or other coverage arc) into N smaller segments. The multi-sector antenna generally radiates power in each sector in a particular angle optimized for that sector. This directional and concentrated power radiation in each sector increases the directional gain of the antenna, and reduces the effects of interference. Therefore, the multisector antennas are more efficient than omni-directional antennas in this regard. The directional power radiation is typically adjustable such as e.g., by using software defined radio and multiple antennas.

Multi-Sector antennas provide a means of increasing cellular network capacity and coverage without using additional frequency spectrum. High-order sectorization is particularly used for cost-effective hotspots. In these hotspot areas multiple antennas with narrow bandwidth and high directivity gain can be used to increase the overall capacity. For instance, one sector of the cell may be used to serve part of a cell that has higher traffic, while an overlapping larger sector may be used to serve in the part of the cell that has lower traffic.

FIG. 3 illustrates a typical prior art multi-sector antenna base station transmitter functional block diagram including baseband and RF components. As shown, in this architecture 300, each antenna 306 (sector) requires a separate RF signal transmitter chain including D/A converter 303, RF front end 305, and power amplifier (PA) 307. As previously noted, these separate PAs and supporting components add appreciable cost to the design (and also may result in greater mutual or inter-sector interference when e.g., two Pas are operating simultaneously). Notably, power amplifiers are one of the most expensive components in wireless infrastructure equipment, and the cost of various components including power amplifiers is an important factor considered in the design of base stations (e.g., CBRS CBSDs including 4G- and 5G-based small cells). In addition, the implementation costs of a given multi-sector antenna solution increases significantly as the number of the antenna sectors increases, due at least in part to the aforementioned increase in power amplifier cost. Therefore, while multi-sector antennas provides improved spectral efficiency by inter alia, shaping the beams to the respective sector(s) of the desired users and providing a better signal-to-interference plus noise ratio (SINR), high implementation costs will generally preclude using such multi-sector antenna architectures efficiently in many scenarios where the cost is an important factor in cell deployment and infrastructure design (such as in mass small-cell consumer deployments).

Accordingly, what is needed are improved apparatus and methods which enable broad deployment of cost-efficient wireless infrastructure architecture on a mass scale, such as to individual customers of a service provider. Ideally, such improved apparatus and methods would significantly reduce both costs of cell development and infrastructure design and manufacturing for wireless systems such as those using quasi-licensed (e.g., CBRS) or unlicensed spectrum.

SUMMARY

The present disclosure addresses the foregoing needs by providing, inter alia, apparatus and methods for enabling cost-efficient wireless services using quasi-licensed spectrum.

In one aspect of the disclosure, a wireless access point is described. In one embodiment, the wireless access point includes: a processor apparatus; a wireless modem chipset in data communication with the processor apparatus; a power amplifier in data communication with wireless modem chipset; a multi-sector antenna apparatus in communication with the power amplifier via switching logic; and a storage device in data communication with the processor apparatus. In one variant, the storage device includes at least one computer program which is configured to, when executed on the processor apparatus, cause selective allocation of the power amplifier to individual ones of the sectors. In one implementation, CBRS GAA or PAL band spectrum is allocated individually to each sector, depending of GAA or PAL availability and/or other factors.

In a further implementation, the wireless access point includes a CBRS (Citizens Broadband Radio Service)-compliant CBSD based on a 3GPP-compliant eNB or gNB architecture. In a further implementation, the wireless access point is a distributed unit (DU) of a 5G NR gNB.

In another aspect of the disclosure, a computerized wireless access apparatus configured for providing wireless access to a plurality of computerized wireless-enabled mobile devices via a quasi-licensed portion of a radio frequency (RF) spectrum is disclosed. In one embodiment, the computerized wireless access includes: a wireless interface configured to transmit and receive RF waveforms in two different bands (e.g., PAL and GAA) of the quasi-licensed portion; digital processor apparatus in data communication with the wireless interface; a multi-sector antenna apparatus with shared power amplifier apparatus; and a storage device in data communication with the digital processor apparatus and comprising at least one computer program.

In one variant, the node comprises a Category A device which operates at or below the 1 W FCC limit. In another variant, the node comprises a Category B CBSD that also includes a 3GPP 4G/4.5/5G protocol stack.

In another variant, the at least one computer program is configured to, when executed by the digital processor apparatus: receive a protocol message from a computerized network node, the protocol message including a information element (IE) directed to the wireless access point specifying PAL or GAA availability in different areas or sectors of the cell, the message causing the wireless access apparatus to select RF carriers for different sectors of the antenna apparatus.

In another aspect of the disclosure, network apparatus is disclosed. In one embodiment, the network apparatus is configured to generate messaging to one or more attached devices regarding RF spectrum/carrier assignment plans, and includes: digital processor apparatus; network interface apparatus in data communication with the digital processor apparatus and configured to transact data with the one or more attached devices; and a storage apparatus in data communication with the digital processor apparatus and comprising at least one computer program. In one variant, the network apparatus comprises a CBRS DP (domain proxy). In another variant, the network apparatus comprises a managed network controller process (e.g., MSO-based controller owned and operated by the MSO and disposed within the MSO's network architecture.

In a further aspect of the disclosure, a fixed wireless access (FWA) apparatus for use within a wireless network is disclosed. In one embodiment, the FWA apparatus comprises a premises device operated by a network operator (e.g., MSO) that is configured to communicate wirelessly with one or more CBSD/xNB devices to obtain wireless backhaul from the premises. In one variant, the FWA apparatus is configured as a Category B CBSD CBRS device and is mounted on the user's premises so as to enable the aforementioned backhaul for WLAN or wireline interfaces within the premises, and further includes a Category A wireless access point with multi-sector antenna and a shared power amplifier and associated sharing or scheduling logic. In one variant, the FWA apparatus is configured such that at least one of the sectors is used for wireless backhaul to a local CBSD, while the remaining sectors are used for GAA/PAL coverage within a local area (i.e., proximate to the premises where installed, such as for proximate UE).

In another aspect, a radio frequency front-end transmitter apparatus is disclosed. In one embodiment, the transmitter apparatus includes a plurality of sector antenna elements, each sector configured operate within a prescribed frequency band (e.g., 3.55-3.70 GHz) to provide service to a prescribed area or region; scheduling logic, and one power amplifier configured to drive the antenna sectors based on the scheduling logic. In one variant, each antenna sector is measured for various parameters of interest; e.g., user traffic and interference in its associated area, and is allocated available bandwidth and spectrum (e.g., GAA or PAL) from a SAS. The transmitter apparatus logic computes a priority weight for each sector, and allocates or schedules each sector to the power amplifier according to the computed priority weight.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In some variants, the foregoing IC includes the scheduling and/or switching logic enabling sharing or allocation of one or more individual power amplifiers between multiple different transmit chains.

In a further aspect, a wireless access point apparatus is disclosed. In one embodiment, the access point apparatus includes: digital processor apparatus; antenna apparatus having a plurality of individual antenna elements associated with respective ones of coverage sectors; at least one wireless transceiver chain in data communication with the digital processor apparatus and antenna apparatus; and switch apparatus in communication with the antenna apparatus and the at least one wireless transceiver chain, the switch apparatus operative switch an output of a power amplifier operatively coupled with the at least one wireless transceiver chain to the individual antenna elements; and computer readable apparatus in data communication with the digital processor apparatus and comprising storage medium, the storage medium comprising at least one computer program comprising a plurality of instructions which are configured to, when executed on the digital processor apparatus, cause the switch apparatus to selectively switch the output to one of the individual antenna elements based at least on a prioritization or weighting scheme.

In one variant, the selective switch the output to the one of the individual antenna elements based at least on a prioritization or weighting scheme includes selective switching based at least on (i) data indicative of an interference level measured for each of the coverage sectors, and (ii) data indicative of an availability of one or more prescribed types or classes of quasi-licensed radio frequency (RF) spectrum.

In another variant, the prioritization or weighting scheme includes at least one interference weight value, and at least one spectrum availability weight value.

In a further variant, the selective switch the output to the one of the individual antenna elements based at least on a prioritization or weighting scheme includes selective switching according to a time-division model, a duration of a temporal period for which the output is switched to the one of the individual antenna elements based at least in part on the prioritization or weighting scheme.

In another variant, the selective switch the output to the one of the individual antenna elements based at least on a prioritization or weighting scheme includes selective switching according to a time-division model, a sequence within which the output is switched to the one of the individual antenna elements relative to others of the individual antenna elements based at least in part on the prioritization or weighting scheme.

In still another variant, the switch apparatus includes a programmable logic device enabling reconfiguration of at least one switching matrix associated with the switch apparatus, the reconfiguration enabling implementation of at least one change to the possible connectivity options for the output of the amplifier to the individual ones of the antenna elements.

In another variant, the wireless access point includes a 3GPP 5G NR (Fifth Generation New Radio) gNodeB apparatus having a controller unit (CU) and at least one distributed unit (DU), the digital processor apparatus and the computer readable apparatus in data communication with the digital processor apparatus each associated with the CU, the CU and the at least one DU disposed at separate physical locations from one another.

In yet another variant, the plurality of instructions are further configured to, when executed, generate and transmit a message to a network computerized process in data communication with the wireless access point to cause obtainment of one or more grants to use RF spectrum of a first type or of a second, different type, the first type and second type having different respective priorities or weights within the prioritization or weighting scheme.

In another aspect of the disclosure, a method of operating a multi-sector wireless base station is described. In one embodiment, the method includes: determining an interference level associated with at least two of a plurality of radio frequency (RF) coverage sectors of the multi-sector wireless base station; determining at least one type of RF spectrum available for use by respective ones of the at least two of the plurality of radio frequency (RF) coverage sectors of the multi-sector wireless base station; and based at least on the determining an interference level and the determining an at least one type of RF spectrum, causing scheduling of a common power amplification apparatus of the of the multi-sector wireless base station for transmission of at least two wireless signals relating to respective at least two user data sessions according to a time-division scheme, such that a first one of the at least two signals is transmitted over a first of the at least two coverage sectors, and a second one of the at least two signals is transmitted over a second of the at least two coverage sectors, the transmission of the first and second signals occurring in sequence according to the time-division scheme.

In one variant, the determining an interference level associated with at least two of a plurality of radio frequency (RF) coverage sectors of the multi-sector wireless base station includes using extant 3GPP interference measurement protocols to measure the interference levels of the respective at least two coverage sectors; and the determining at least one type of RF spectrum available for use by respective ones of the at least two of the plurality of radio frequency (RF) coverage sectors of the multi-sector wireless base station includes causing access to a network spectrum allocation process via a communication backhaul of the multi-sector wireless base station.

In one implementation thereof, the causing access to a network spectrum allocation process via a communication backhaul of the multi-sector wireless base station includes causing access to a CBRS (Citizens Broadband Radio Service) SAS (Spectrum Allocation System) via a backhaul infrastructure of a managed hybrid fiber coaxial cable network.

In another variant of the method, the causing scheduling of a common power amplification apparatus of the of the multi-sector wireless base station for transmission of at least two wireless signals relating to respective at least two user data sessions according to a time-division scheme includes: generating a plurality of first weights, respective ones of the plurality of first weights associated with respective ones of the at least two coverage sectors and based at least in part on the respective determined interference levels; generating a plurality of second weights, respective ones of the plurality of second weights associated with respective ones of the at least two coverage sectors and based at least in part on the respective determined at least one spectrum type; aggregating at least a portion of the first plurality of weights with at least a portion of the second plurality of weights to form an aggregated weight for each of the at least two coverage sectors; and using the aggregated weights for the at least two coverage sectors to determine a scheduling priority, the scheduling priority used in said scheduling according to the time-division scheme.

In another embodiment, the method includes: obtaining a first information element (IE) comprising data relating to the type of spectrum available (GAA or PAL) in that area or region; obtaining a second information element (IE) comprising data relating to available bandwidth in that area or region; obtaining a third information element (IE) comprising data relating to interference level in that area or region; and obtaining a fourth information element (IE) comprising data relating to user traffic in that area or region; computing priority weights for each sector based on the obtained information elements; allocate the power amplifier to each antenna sector according to the computed priority weight.

In one variant, the first IE is generated based at least in part on data received from one of a SAS (Spectrum Access System) or a Domain Proxy (DP) indicating the availability of the type of spectrum (e.g., GAA or PAL); and the second IE is generated based at least in part on data received from one of a SAS (Spectrum Access System) or a Domain Proxy (DP) indicating the availability of amount of spectrum in quasi-licensed band.

In one implementation, both the spectrum includes a frequency band between 3.550 and 3.700 GHz.

In yet a further aspect of the disclosure, switching apparatus for use in a wireless access point is disclosed. In one embodiment, the apparatus includes: reconfigurable switch apparatus configured to selectively port an output of a shared power amplification device of the wireless access point to a subset of a plurality of antenna elements of the wireless access point based on at least one control input to the reconfigurable switch apparatus; and computerized logic apparatus in communication with the reconfigurable switch apparatus and configured to generate a utilization schedule for use of the shared power amplification apparatus based on a plurality of input data, and generate the at least one control input for controlling at least the reconfigurable switch apparatus according to the generated utilization schedule.

In one variant, the utilization schedule includes a time-division based schedule comprising pluralities of allocable time slots within respective ones of time periods or frames, the allocable time slots each being separately allocable to different ones of the plurality of antenna elements.

In another variant, the plurality of input data relates to (i) RF interference levels associated with respective ones of azimuth sectors of the plurality of antenna elements; and (ii)

data relating to quasi-licensed spectrum available for use by respective ones of the azimuth sectors of the plurality of antenna elements for transmitting signals output from the shared power amplification apparatus.

In a further aspect, a network architecture is disclosed. In one embodiment, the architecture includes: (i) a domain proxy (DP) or controller entity; and (ii) a plurality of Category A wireless access point devices disposed at respective user or subscriber premises. In one variant, the DP/controller negotiates with a SAS to obtain GAA spectrum allocation(s) and/or PAL spectrum allocation(s), generates a frequency use plan, and transmits data relating to the allocations relative to the use plan to the various wireless access points so as to implement the frequency use plan using both PAL and GAA spectrum. Individual access points schedule accesses for their individual sectors to the assigned spectrum using a common power amplifier. In one implementation, only the PAL spectrum is considered in the use plan; GAA is freely assigned for e.g., indoor uses.

In an additional aspect of the disclosure, computer readable apparatus is described. In one embodiment, the apparatus includes a storage medium configured to store one or more computer programs. In one embodiment, the apparatus includes a program memory or HDD or SSD on a computerized controller device, such as an MSO controller, DP, or SAS entity. In another embodiment, the apparatus includes a program memory, HDD or SSD on a computerized access node (e.g., CBSD/xNB or CPE FWA).

In a further aspect, a method of reducing interference is disclosed. In one embodiment, the method includes utilizing a first RF spectrum type within a first region of coverage of a multi-sector antenna, and using a second RF spectrum type in a second region of coverage. For instance, the first RF spectrum type may be CBRS GAA spectrum which is expected to be comparatively "polluted" with multiple unlicensed users, and the first region may be an indoor region of a building, the indoor region have a limited number of other possible users and being at least partly shielded from external/exterior unlicensed users. The second RF spectrum (e.g., PAL) is ostensibly more sparsely used, and hence better suited to a higher (prospective) interference environment. In one variant, the higher priority, reduced interference spectrum is scheduled preferentially for use of a common power amplifier.

In one aspect, a method for providing wireless identifier assignment is disclosed. In one embodiment, the identifier being allocated includes a sector within a CBRS-band spectrum base station, and the method includes communicating data between at least one CBSD/xNB and a SAS for registration of individual sectors of a base station, the individual sectors which are each assigned a unique ID. In one variant, the SAS treats each individual sector as a base station, and the scheduler of the base station (and/or controller) schedules use of the power amplifier based at least in part on spectrum available/allocated to each sector.

These and other aspects shall become apparent when considered in light of the disclosure provided herein.

DETAILED DESCRIPTION

Figure 1:
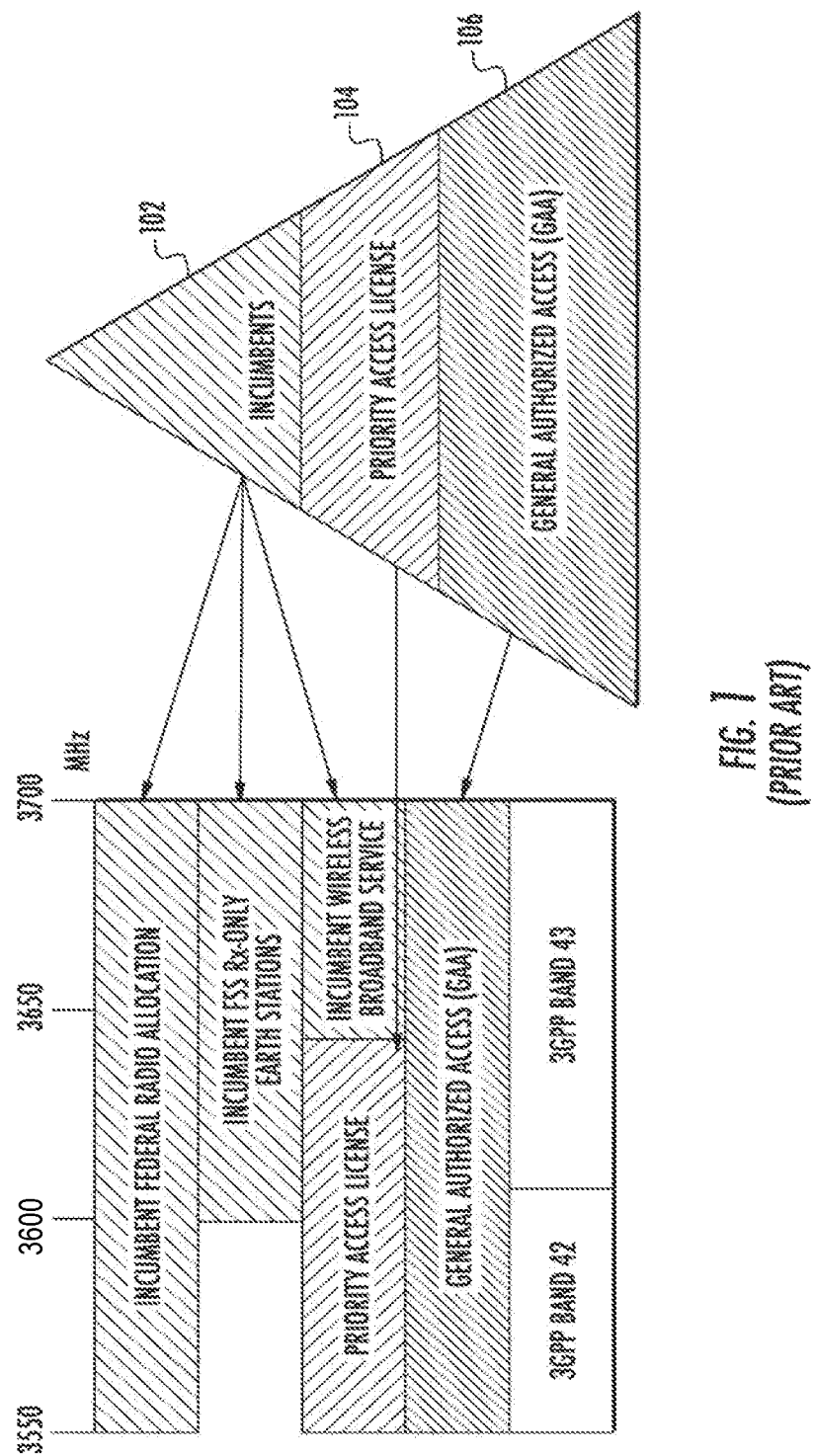
FIG. 1 is a graphical illustration of prior art CBRS (Citizens Broadband Radio Service) users and their relationship to allocated frequency spectrum in the 3.550 to 3.700 GHz band.
Figure 1A:
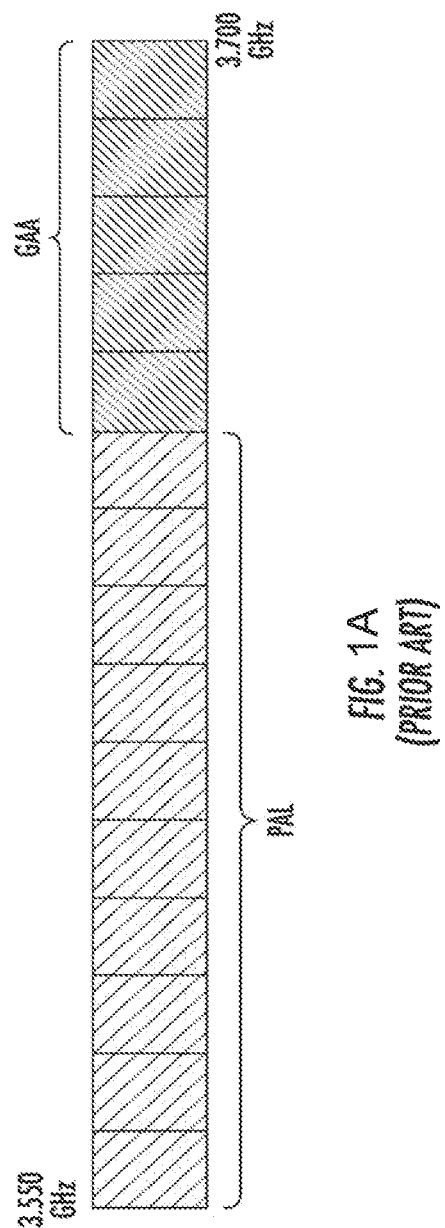
FIG. 1A is a graphical representation of allocations for PAL versus GAA users within the frequency band of FIG. 1.
Figure 2:
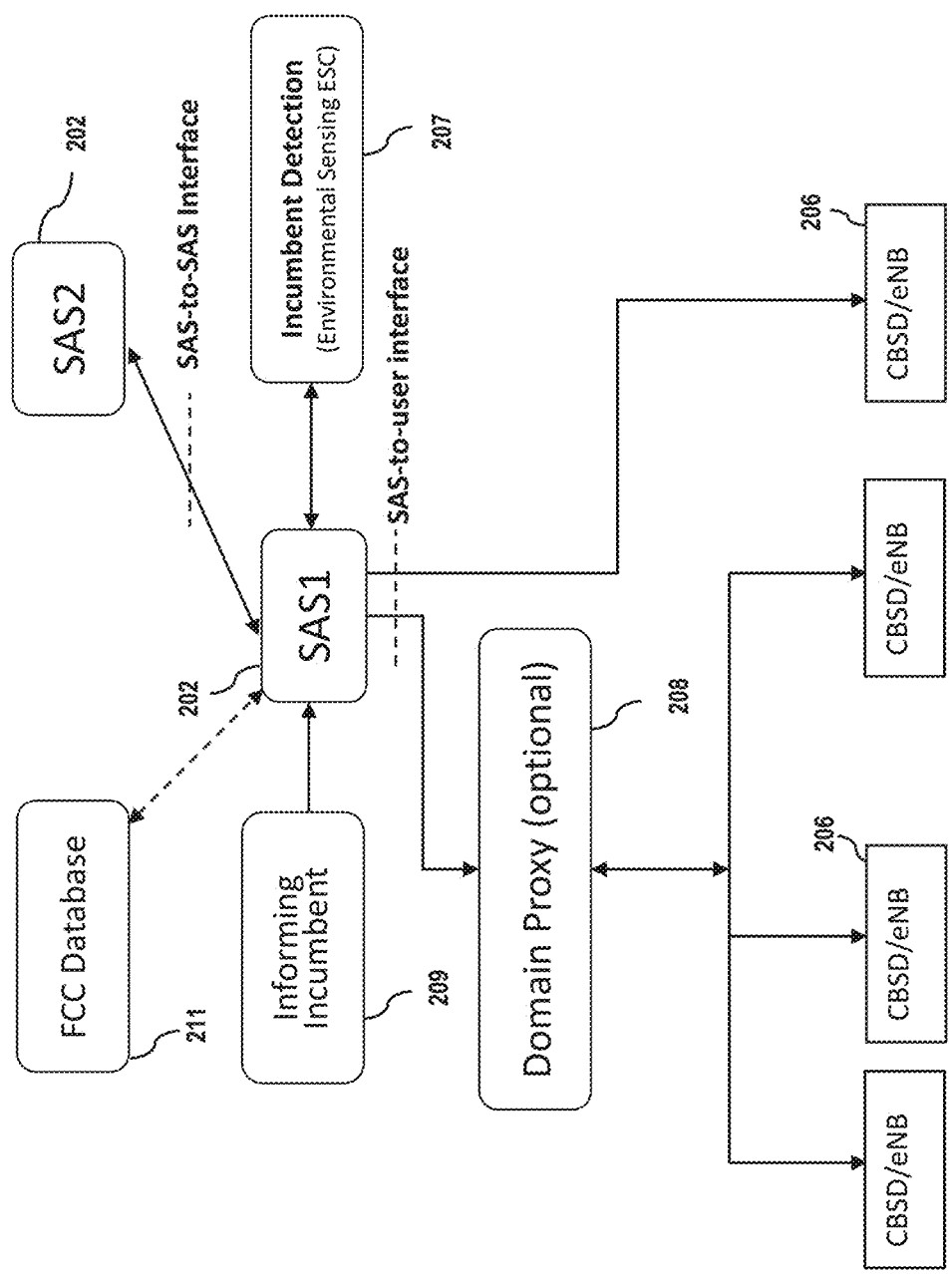
FIG. 2 is a block diagram illustrating a general architecture for the CBRS system of the prior art.
Figure 3:
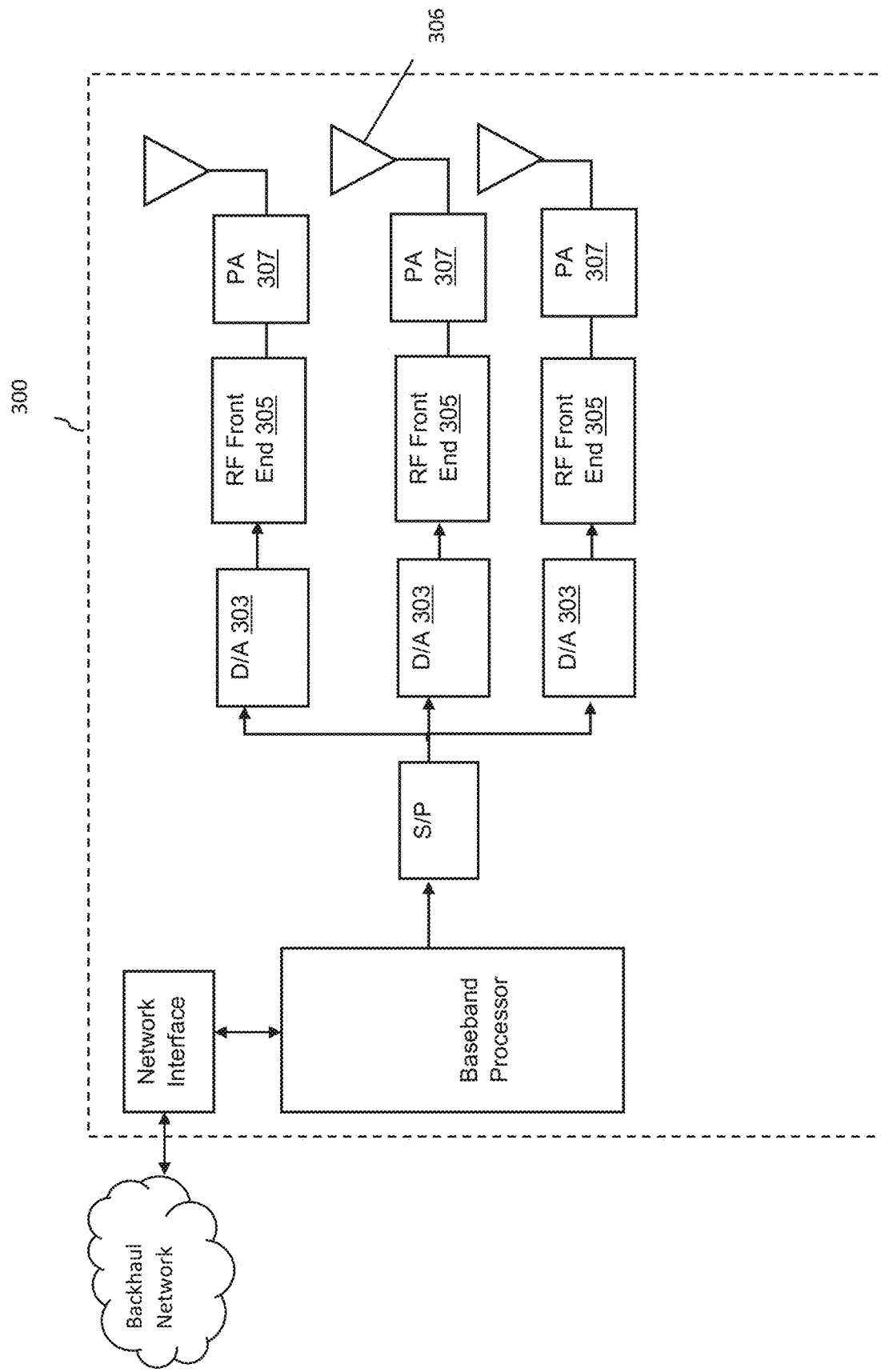
FIG. 3 is a block diagram of a prior art base station transmitter architecture.

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2/3/4/5/6 SDRAM, EDO/FPMS, RLDRAM, SRAM, "flash" memory (e.g., NAND/NOR), 3D memory, HBM/HBM2, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved methods and apparatus for e.g., heterogeneous coverage of a premises or area using wireless spectrum, such as "quasi-licensed" spectrum provided by CBRS technology initiatives (e.g., GAA or PAL spectrum) as previously shown in FIG. 1 herein. These methods and apparatus may advantageously be adapted for consumer premises and similar "mass" deployments based on, inter alia, reduced cost of designing and manufacturing small-cell devices which may be deployed at such premises or areas, based at least in part on use of a shared amplifier architecture and scheduling algorithms within the design.

In an exemplary embodiment, a tri-point "star" configurable base station or small-cell (which may be used for both indoor and outdoor coverage) with amplifier scheduling as referenced above is provided. Each lobe of the improved base station covers users within a different sector. In one implementation, a single power amplifier is shared between the different antenna sectors (i.e., 3), with the amplifier and associated scheduling logic allocating RF signals to/from different sectors according to a time-division scheme. In one configuration, a scheduler process within the logic determines and supervises the amount of time the power amplifier (PA) needs to be allocated to each sector, such as based on data derived from monitoring of interference, traffic, amount of spectrum, and GAA/PAL spectrum availability in each sector, and adaptively calculates the amount of time the PA is required to be allocated to each sector based on a derived weighted prioritization calculation. As such, the sole amplifier is optimized for utilization effectively 100% of the time, in contrast to prior art approaches utilizing multiple amplifiers which add cost and may sit idle for periods when a given sector is not being utilized.

In an alternate configuration, the base station scheduler logic is implemented at least partly within a network-based process in communication with the base station (and others, so as to permit e.g., coordinated operation/scheduling between two or more different base stations).

In one exemplary implementation of the base station, a lobe may cover the indoor portion of a premises or venue, while the other lobes cover outdoor (e.g., on-street). GAA spectrum can be for instance allocated to the indoor sectors, while PAL spectrum is allocated to the outdoor sectors. Based on the prioritization weighting scheme, the base station amplifier will be allocated preferentially to the PAL spectrum sectors.

The exemplary configuration described above provides better coverage area and interference management due to higher gain and directionality in each sector as compared to an omni-directional antenna, while concurrently reducing the implementation and deployment costs of base stations and small-cells. In addition, by reducing the number of power amplifiers in the base station, base station/small-cell hardware footprint and the need for supporting components such as PCBs, passive electronic components, etc. are also reduced significantly.

Moreover, by effectively "commoditizing" such devices, they can also be deployed much more widely by service providers such as e.g., cable or other wireless network operators.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio) via e.g., broadband services. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz), C-Band, NR-U, or yet other types of spectrum (including mmWave frequencies above e.g., 40 GHz).

Moreover, while various aspects of the present disclosure are described in detail with respect to so-called "4G/4.5G" 3GPP Standards (aka LTE/LTE-A), such aspects—including allocation/use/withdrawal of CBRS spectrum—are generally access technology agnostic and hence may be used across different access technologies, including so-called 5G "New Radio" (3GPP Release 15 and TS 38.XXX Series Standards and beyond).

Other features and advantages of the present disclosure will immediately be recognized by persons of ordinary skill in the art with reference to the attached drawings and detailed description of exemplary embodiments as given below.

Multi-Sector Antenna and Base Station Architecture—

Figure 4:
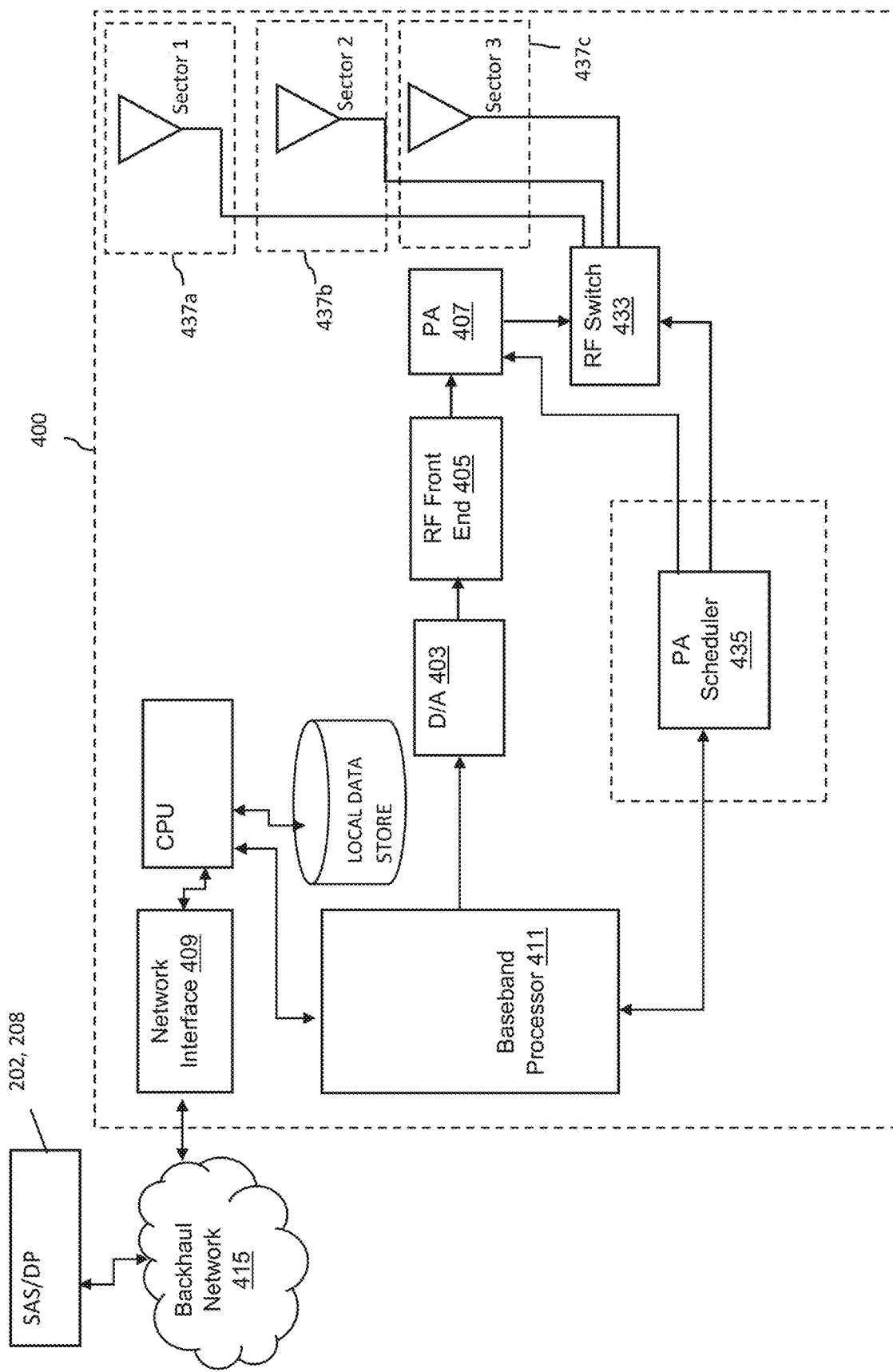
FIG. 4 is a high-level block diagram illustrating an exemplary base station (e.g., CBSD/xNB) transmitter architecture according to the present disclosure.

FIG. 4 illustrates one embodiment of a multi-sector antenna base station transmitter architecture 400 according the present disclosure. In one variant, the device 400 includes one or more network interfaces 409, baseband processor 411, D/A conversion apparatus 403, RF front end (e.g., mixers and other related components as required for the particular technology used for the underlying air interface) 505, power amplifier (PA) 407, RF switch logic 433, and PA scheduler logic 435. Individual antenna sectors 437a-c (each comprising one or more individual antenna elements) are used to transmit the generated RF signals, as well as receive signals from e.g., user devices such as 3GPP-enabled UE operating in unlicensed/quasi-licensed bands.

It will be appreciated that the components of the device 400 may be individually or partially implemented in software, firmware and/or hardware, and may take on any number of different architectures supporting different multiple access technology (such as e.g., the OFDM-based architecture shown in the example of FIG. 4A described subsequently herein).

In the illustrated embodiment, the base station 400 is configured as a CBRS CBSD (i.e., which is compliant with CBRS standards and which is configured to operate in 3.550 to 3.700 Ghz range, including General Authorized Access (GAA) spectrum as well as Priority Access License (PAL) spectrum), and utilizes 3GPP-based technology as the underlying wireless access/air interface technology.

As shown, the S/P conversion 413, D/A 403, RF front end 405 and PA 407 are in the present embodiment shared between antenna sectors, although it will be appreciated that in other configurations, only the PA 407 may be shared, and e.g., individual transmitter chains maintained which can utilize the shared PA based on the scheduler logic 435 (see discussion of FIG. 4B below).

Figure 10:
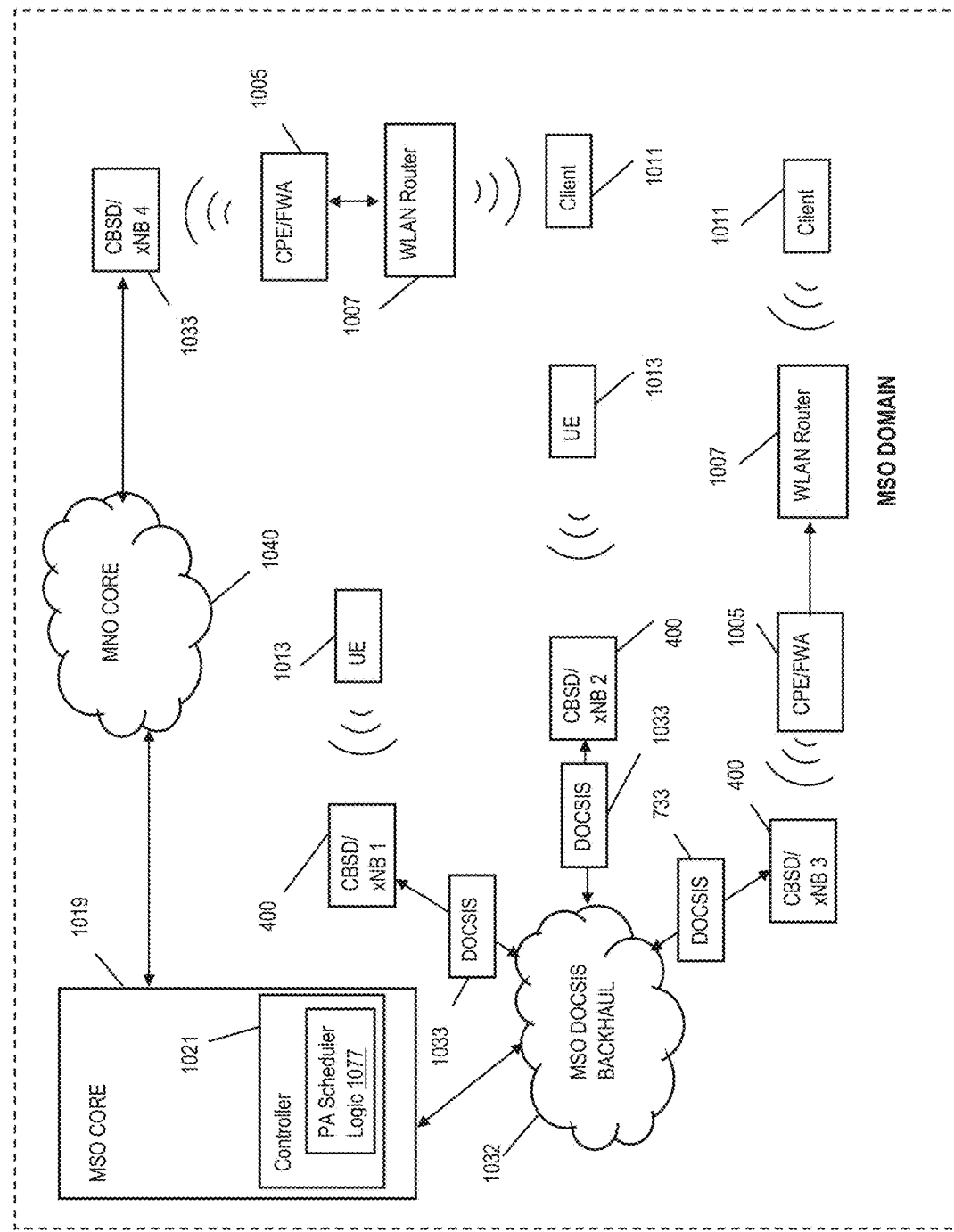
FIG. 10 is a functional block diagram of an exemplary network architecture useful in conjunction with various principles described herein.

The network interface 409 connects the device 400 to various network entities such an MSO CBRS or HFC network via a backhaul such as a DOCSIS modem or optical fiber (see FIG. 10).

The illustrated base station 400 includes a baseband processor module 411 which processes the digital domain signal (baseband) to be transmitted via the relevant sector(s) to e.g., UEs or CBRS FWA apparatus. The RF front end 405 converts the baseband signal to radio frequency signal (e.g., GAA or PAL spectrum), and may include an up-conversion (e.g., to IF) in some architectures. The PA 407 converts the low power RF (analog domain) signal from the RF front end 405 into a higher power radio frequency signal at transmission frequency to drive one or more of the antenna sectors.

The PA scheduler logic 435 calculates priority weights for each sector based on, inter alia, the relevant parameter data associated with each sector (see discussion of FIGS. 6-7B), and based on the calculated weights, allocates the PA 407 to different sector(s) in a time division multiplexing (TDM) scheme via the RF switch 433. In one implementation, a prescribed time slot period is utilized (e.g., T ms per slot), and the different sectors are allocated a given number of consecutive slots (ranging from 0 to N), per a schedule generated by the scheduler logic 435 for each period of operation. It will be appreciated that while time-based division is utilized in this embodiment, other schemes for multiple access of the PA may be implemented, such as where priority traffic must complete processing and transmission before the PA is re-allocated, e.g., irrespective of the number of temporal periods or slots used.

The RF switch 435 connects the high-power RF signal at the output of the PA 407 selectively to only one of the antenna sectors (or aggregates of sectors; see FIG. 4D) based on a PA scheduler command received at the switch 433.

Moreover, as shown, the scheduler 435 may also provide input to the PA 407 (whether directly, or via a proxy such as a microcontroller or other device—not shown) for control thereof, such as to enable reduction or increase in the output of the PA as a function of switch selections. For instance, where multiple antenna elements are connected to the switch and PA at once (see discussion of FIG. 4D below), the scheduler may signal the PA 407 to accordingly increase its power or gain.

It will be appreciated that the PA scheduler 355 can be integrated in any of network components or implemented as a separate device in the network. In one implementation, the PA scheduler 435 may be implemented entirely in the base station (e.g., CBSD/xNB), including within sub-portions thereof (see e.g., FIGS. 8A and 8B herein, wherein varying 3GPP 5G NR gNB CU/DU architectures are adapted to the functionality of the present disclosure).

In another implementation the PA scheduler 435 may be implemented in a network controller, such as one at a local or edge node of the network operator's network (e.g., MSO HFC network), or even a core or headend portion thereof. In other implementations, the network scheduler/controller logic and local (base station) scheduler controller logic are utilized, with the two processes in data communication with one another over the base station backhaul (e.g., DOC SIS channel(s)).

Figure 4A:
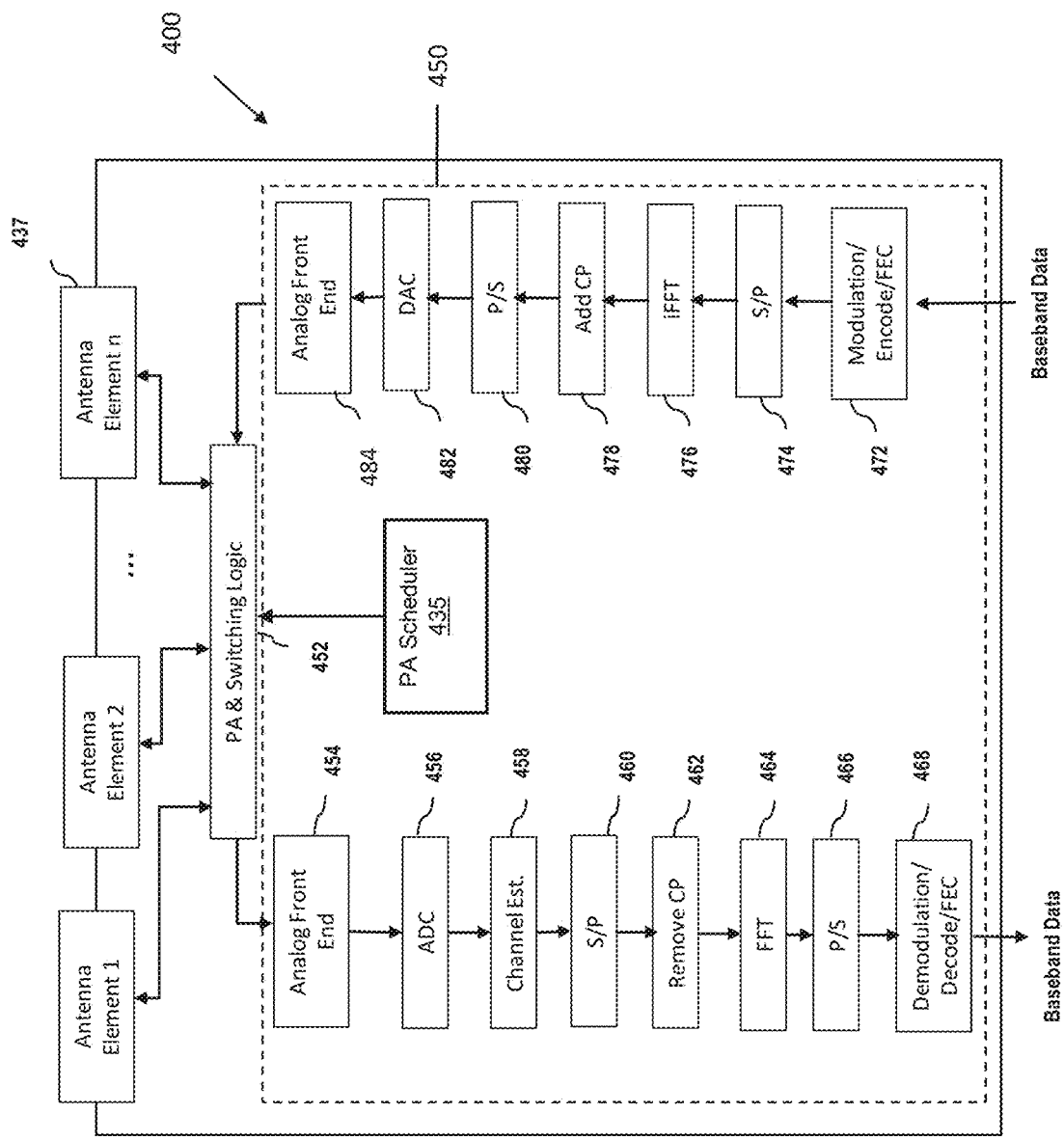
FIG. 4A is a functional block diagram illustrating one implementation of the radio apparatus of FIG. 4, showing OFDM-based transmitter/receiver chains.

FIG. 4A illustrates one particular implementation of the architecture of an RF transceiver 450 used in the base station apparatus 400, including an integrated PA and switching function 452. It will be appreciated that while an OFDM-based radio apparatus having switched receiver and transmitter chains is shown, the present disclosure is in no way limited to either OFDM modulation/access schemes, nor switched chains (or for that matter discrete chains).

As shown in FIG. 4A, the antenna element(s) of the sectors 437 are accessed by the transmitter or receiver chains via a PA and switching matrix 452. For instance, in one variant, the PA/switching matrix 452 allows two elements 437 to be accessed by the same chain simultaneously, while other elements 437 are not accessed thereby (see FIG. 4D). Alternatively, individual antenna elements can be accessed individually by respective ones of the chains (FIG. 4B). For instance, as previously noted, TDM-based switching may be used for sharing of the power amplifier (and hence by extension the connected antenna element(s) 437) in some approaches.

It will be recognized that the PA and switching logic in this embodiment selectively channels the transmit signal to the various sector(s) 437 based on the inputs from the PA scheduler 435; however, for the receive operations, the exemplary embodiment does not contemplate any scheduling analogous to the PA scheduling on the transmit side, or coordination with the scheduling thereof, other than that associated with the underlying radio protocols. This is largely an artifact of the temporal duration of the scheduling for a given sector typically being significantly longer that any "transmit/receive" processes with timeouts, such as e.g., HARQ, the latter which may complete in a very short period comparatively. It will be recognized, however, that some level of coordination between transmit/PA scheduling and receive operations may be employed if desired, consistent with the disclosure. For instance, a transmitter chain using the power amp may be scheduled to include certain receive "windows" for the same antenna sector(s).

It will further be recognized that the PA and switching logic 452 may also be controlled by the FPGA (e.g., one or more configurable logic blocks or CLBs thereof), or other logic, so as to effectuate the desired utilization of the antenna element(s) and/or transmitter/receiver chains of each base station.

In the receiver chain, analog OTA signals are received by the antenna element(s) 437 and switched to the receiver via the switch 452, where they are received by the analog front end 454. They are filtered, down-converted (as needed) such as via IF mixer logic, and converted to the digital domain by the ADC 456. Channel estimation is performed in the CE 458, and serial-to-parallel conversion applied 460. Cyclic prefixes are removed at the CP logic 462, and an FFT 464 applied to transfer the signals from the time domain t frequency domain. Parallel to serial conversion is then applied 466, and the resulting signals demodulated, decoded, and any FEC 468 applied (e.g., Turbo or LDPC) to extract the baseband data.

Conversely, in the transmitter chain, the FEC, encoding, and modulation are applied 472, S/P conversion performed 474, IFFT applied 476, CP added 478, P/S conversion applied 480, and the resulting data is then converted to the analog domain per the DAC 482 for processing by the analog front end 484 and transmission via the antenna element(s) 437 by way of the PA and switching logic 452.

Figure 4B:
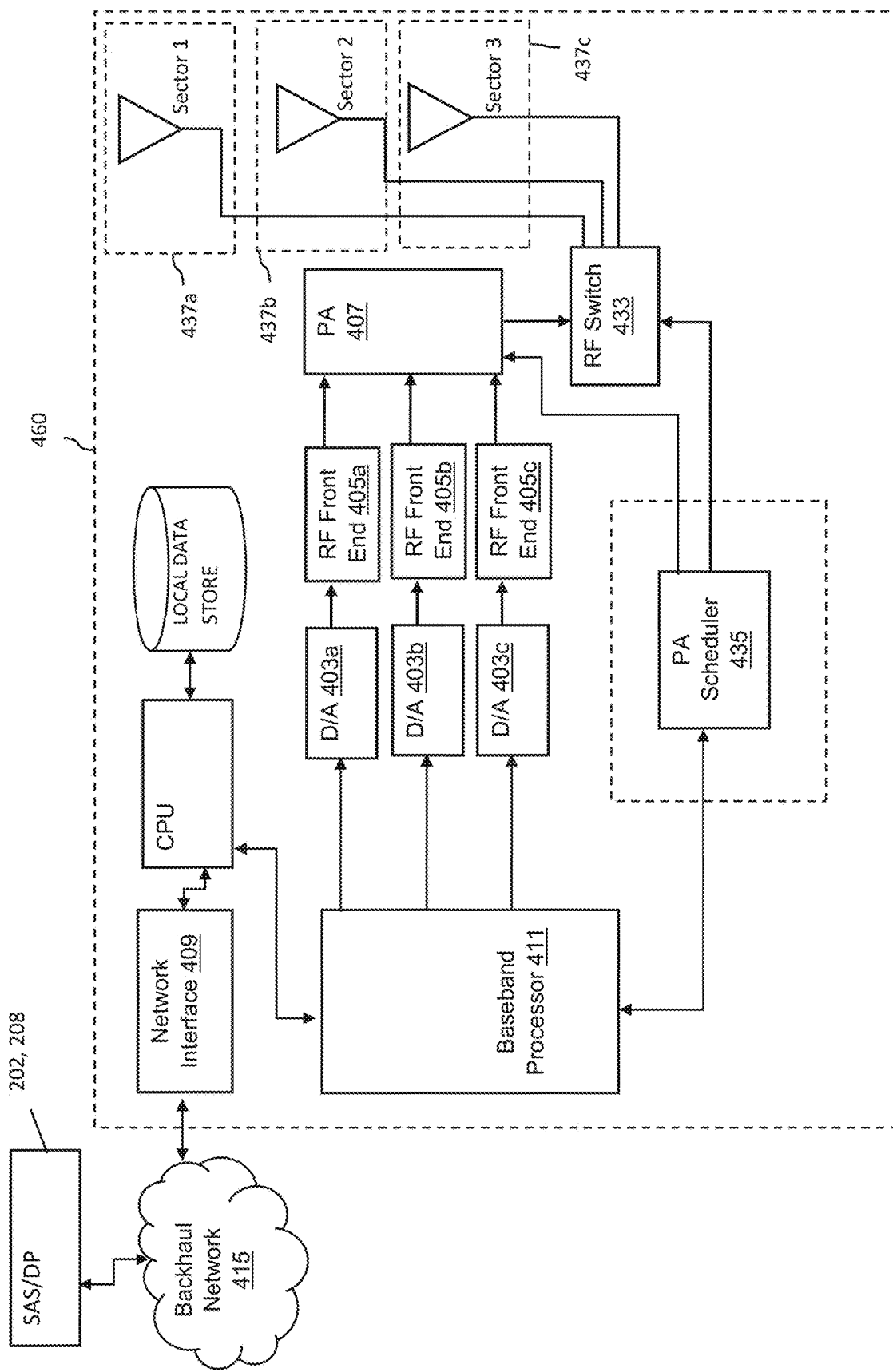
FIG. 4B is a high-level block diagram illustrating another exemplary base station (e.g., CBSD/xNB) transmitter architecture according to the present disclosure, wherein individual transmitter chains are used with a common power amplifier.

In the illustrated embodiment of FIG. 4B, the base station 460 is again configured as a CBRS CBSD (i.e., which is compliant with CBRS standards and which is configured to operate in 3.550 to 3.700 Ghz range, including General Authorized Access (GAA) spectrum as well as well as Priority Access License (PAL) spectrum), and utilizes 3GPP-based technology as the underlying wireless access/air interface technology. However, as shown, only the PA 407 (and associated scheduler 435 and switch 433) is in the present embodiment shared between antenna sectors; three separate transmitter chains having respective S/P conversion 413a, 413b, 413c, D/A 403a, 403b, 403c, and RF front end 405a, 405b, 405c are utilized for processing the individual signals associated with the respective sectors they serve.

Figure 4C:
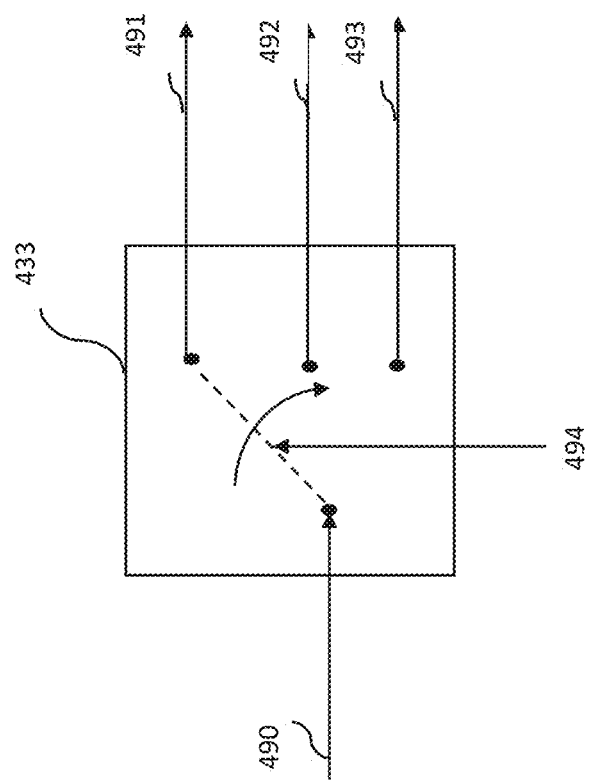
FIG. 4C is a block diagram illustrating a first implementation of an RF switch according used in the exemplary CBSD/xNB transmitter architecture according to the present disclosure.

FIG. 4C illustrates, at a high level, the logic of one embodiment of a programmable RF switch 433. The data or signal link 494 receives in one embodiment signaling (such as software commands or analog signaling, depending on implementation) from the PA scheduler 435 to connect the PA output link 490 to one of the links to the various antenna sectors 491, 492, or 493. It will be appreciated that the logic embodied in the switch functionality of FIG. 4B may be implemented in hardware, software, or combinations thereof. For instance, reprogrammable logic such as an FPGA may be used to implement switching functions at the direction of the scheduler process 433. Alternatively, high-speed hardware logic (e.g., via an ASIC) can be used to implement the switching functionality, at cost of limited/no re-programmability or reconfiguration. Trade-offs between the speed of hardware-based solutions such as ASICs and software-based solutions (e.g., as may be implemented within a processor core operative on an FPGA) may be balanced depending on the requirements of the given application, as will be readily accomplished by those of ordinary sill provided the present disclosure.

Figure 4D:
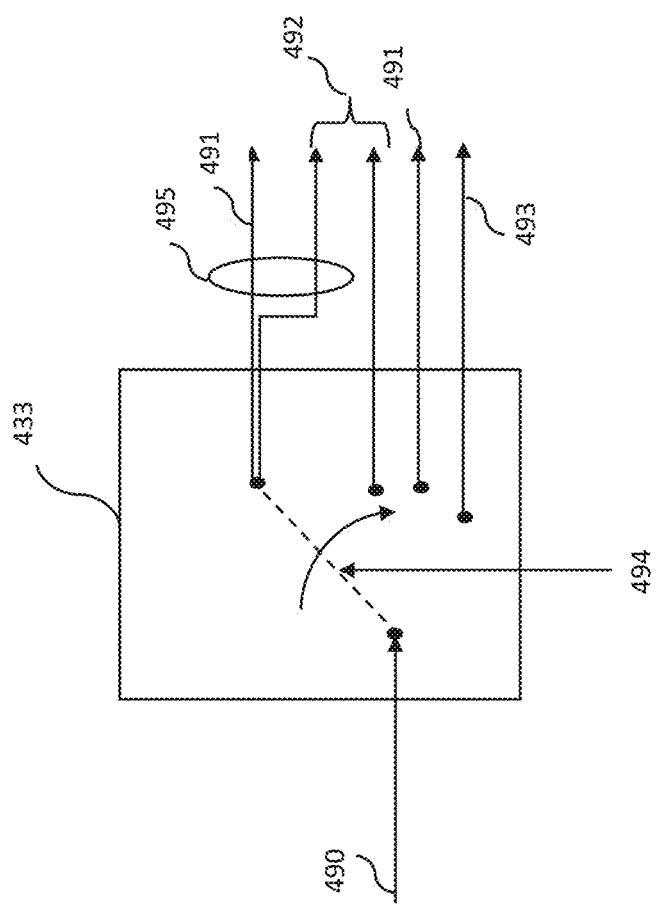
FIG. 4D is a block diagram illustrating a second implementation of an RF switch according used in the exemplary CBSD/xNB transmitter architecture according to the present disclosure.

In the alternate embodiment of FIG. 4D, the switch function 433 is configured such that two "ganged" sectors 495 can be selected for transmission by the PA scheduler 435, such as in cases where it is desired to transmit common spatially diverse signals (e.g., MIMO) to increase spatial coverage, without increasing throughput. In effect, the same signal is "broadcast" over the two sectors to enhance coverage for that signal. Alternatively, the logic shown in FIG. 4D can also select each of the sectors individually if desired. Notably, when selecting aggregated sets of sectors, power from the PA may also be accordingly increased (such as based on linear or logarithmic relationship, as applicable) if desired to compensate for diversion or splitting of the signal across e.g., two antenna elements (thereby reducing EIRP over that of the entirety of the same signal were provided to only one sector/antenna element).

Yet other configurations and combinations will be appreciated, including those which may be dynamically varied, such as via reprogramming of the aforementioned FPGA where used. For instance, whereas two given sectors 491, 492 are shown ganged in the embodiment of FIG. 4D, two different sectors may be aggregated when the gate logic is reprogrammed (such as under remote command of the scheduler or a network controller, as discussed elsewhere herein). Similarly, three of say 4 or 6 sectors (total) may be aggregated as another example.

It will also be appreciated that, through utilization of "scheduled" transmission from each of the different sectors of the base station, some reduction in cross-sector or mutual interference may be obtained as compared to prior art approaches with dedicated PAs for each chain, and the ability to transmit from each respective sector simultaneously. While interference due to external transmitters (e.g., other CBSDs or UEs with which the BS is communicating or otherwise exposed to), control of the different sectors of the inventive BS can reduce interference caused by one transmitting sector not "polluting" its adjacent sectors while such adjacent sectors are also transmitting (due to e.g., side or back lobes of the antenna which may be mitigated but often not completely eliminated). In the illustrated embodiment of the BS, two adjacent sectors are never active (because they must in fact share the power amplifier and hence cannot transmit at same time). Since 100% throughput capability is rarely if ever required for all sectors simultaneously, the otherwise "wasted capacity" of the prior art multi-PA system is instead traded for reduced BS cost and complexity, and reduced inter-sector interference (at least in some operating scenarios).

Distributed gNB Architectures—

Figure 5A:
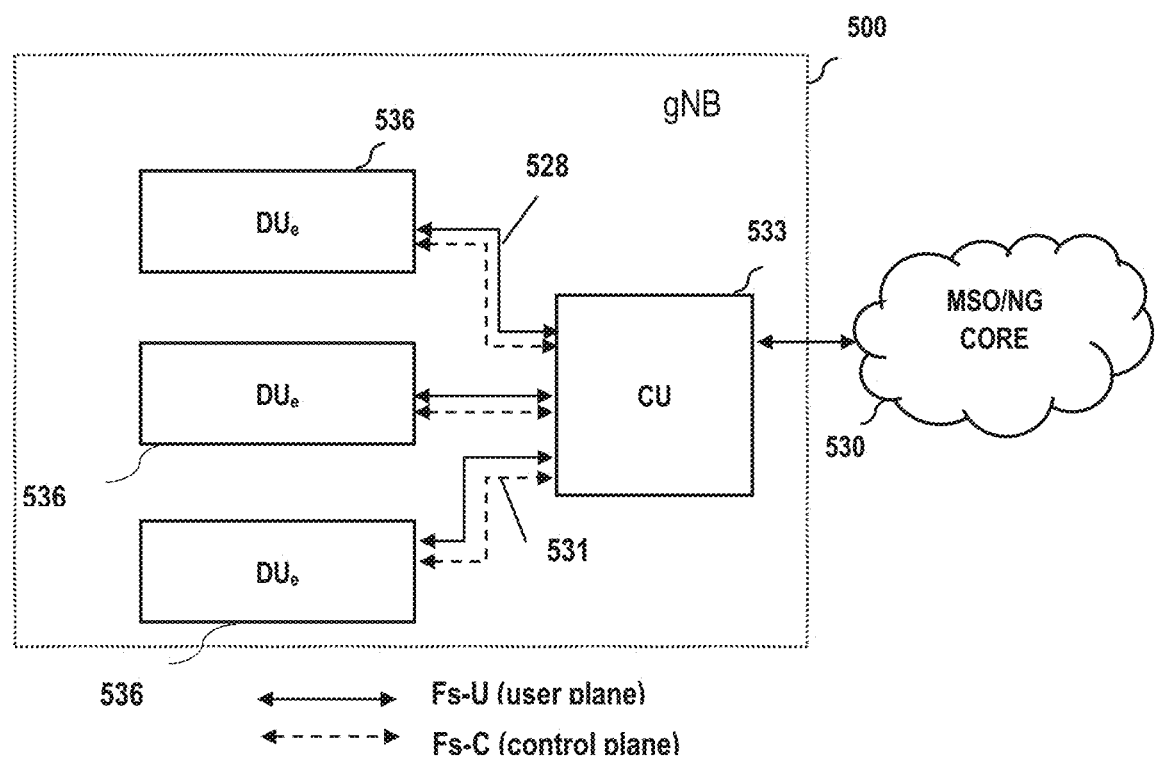
FIG. 5A is functional block diagram illustrating one implementation of the base station apparatus as a 3GPP gNB with enhanced DU (DUe).
Figure 5B:
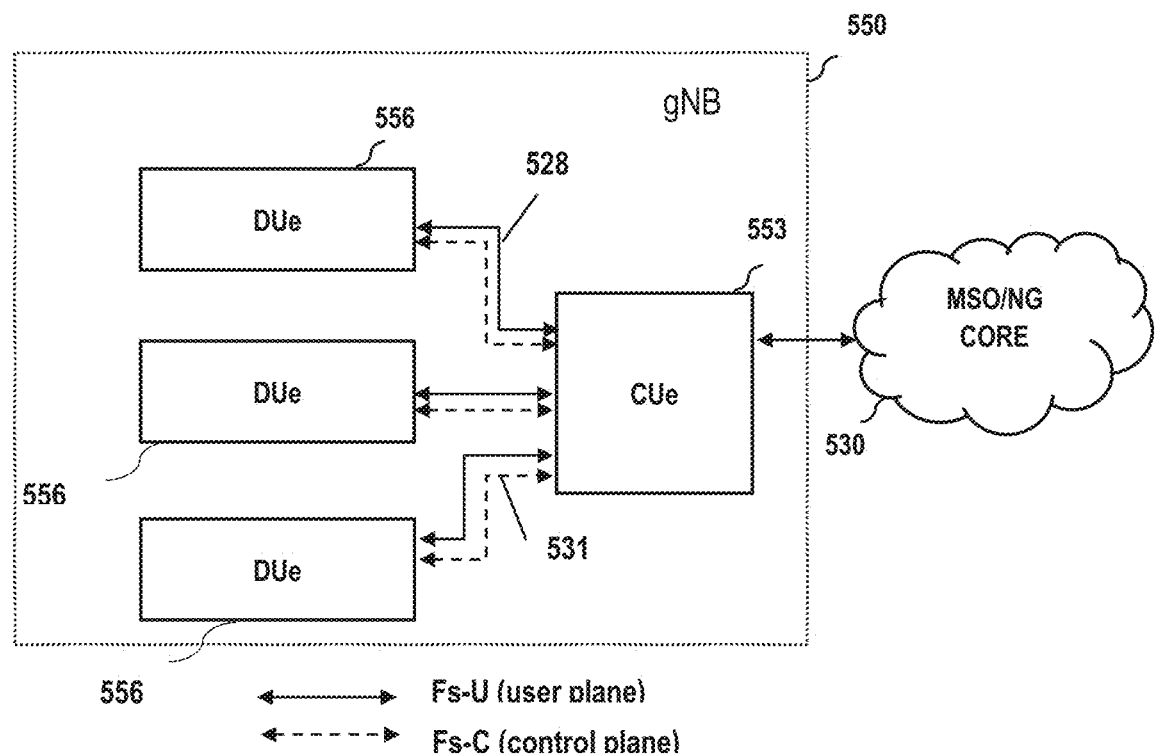
FIG. 5B is functional block diagram illustrating one implementation of the base station apparatus as a 3GPP gNB with enhanced CU (CUe).

Referring now to FIGS. 5A and 5B, various embodiments of a distributed (CU/DU) gNB architecture according to the present disclosure are described. As previously noted, in some implementations, the base station 400 of FIG. 4 may be configured as a 3GPP 5G NR compliant gNodeB (gNB). As such, multiple distributed units (DUs) within the gNB model may be coordinated or controlled by a common controller unit (CU). In some variants, the base station 400 previously described may be embodied as one of the multiple controlled DU (i.e., a DUe or enhanced DU) deployed at e.g., a venue or customer premises as a group (e.g., two or more) small-cells each with multi-sector capabilities and PA scheduling as described herein (FIG. 5A). Alternatively, functions of the base station 400 such as the scheduler logic 435 may be embodied within an enhanced CU (DUe) which may be disposed locally or remote from the controlled DU (FIG. 5B).

As shown in FIG. 5A, a first architecture 500 includes a gNB 500 having a CU (CU) 533 and a plurality of enhanced DUs (DUe) 536. As described elsewhere herein, these enhanced entities are enabled to permit efficient PA scheduling and even inter-DUe coordination, whether autonomously or under control of another logical entity (such as the CU, or NG Core 530 with which the gNB communicates, or components thereof).

The individual DUe's 536 in FIG. 5A communicate data and messaging with the CU 533 via interposed physical communication interfaces 528 and logical interfaces 531. Such interfaces may include a user plane and control plane, and be embodied in prescribed protocols such as F1AP. It will be noted that in this embodiment, one CU 533 is associated with one or more DUe's 536, yet a given DUe is only associated with a single CU. Likewise, the single CU is communicative with a single NG Core 403, such as that operated by an MNO or MSO. Each NG Core 530 may have multiple gNBs 500 associated therewith.

In the architecture 550 of FIG. 5B, the gNB includes sectorized DUe 556 which include a single power amplifier each (or multiple shared PAs), yet the scheduling logic 435 is disposed within the CUe 553, such that the CUe schedules each of the PA devices for each associated DUe collectively. This approach has the advantage of, inter alia, giving the CUe scheduler process 435 a "high level" view of the ID, spectrum allocation, interference, user load, etc. of each individual DUe 556 (the latter which may be disposed proximate one another with at least some overlap of one or more sectors, or at disparate locations having little if any sector overlap). Hence, the CUe in FIG. 5B can coordinate the activities (including scheduling) of two or more DUe such that for instance mutual interference between two sectors of adjacent (overlapping) DUe is minimized, thereby also reducing transmission power requirements on the PA.

It will also be appreciated that while described primarily with respect to a unitary gNB-CU entity or device as shown in FIGS. 5A-5B, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 5A and 5B. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core 403).

Split options between the DUe and CUe in the present disclosure may include for example:
  Option 1 (RRC/PCDP split)
  Option 2 (PDCP/RLC split)
  Option 3 (Intra RLC split)
  Option 4 (RLC-MAC split)
  Option 5 (Intra MAC split)
  Option 6 (MAC-PHY split)
  Option 7 (Intra PHY split)
  Option 8 (PHY-RF split)

Under Option 1 (RRC/PDCP split), the RRC (radio resource control) is in the CU or CUe 553 while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CU/CUe (with split user plane and control plane stacks), and RLC, MAC, physical layer and RF in the DUe's 536, 556.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CU or CUe 553, while MAC, physical layer, and RF are maintained in the DUe's.

Under Option 5 (Intra-MAC split), RF, physical layer and lower part of the MAC layer (Low-MAC) are in the DUe's, while the higher part of the MAC layer (High-MAC), RLC and PDCP are in the CU or CUe 553.

Under Option 6 (MAC-PHY split), the MAC and upper layers are in the CUe, while the PHY layer and RF are in the DUe's. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements, and may also in some embodiments carry PA scheduling data or inputs to the scheduling algorithms executing on any given DUe as applicable.

Under Option 7 (Intra-PHY split), different sub-options for UL (uplink) and DL downlink) may occur independently. For example, in the UL, FFT (Fast Fourier Transform) and CP removal may reside in the DUe's, while remaining functions reside in the CU/CUe. In the DL, iFFT and CP addition may reside in the DUe, while the remainder of the PHY resides in the CU/CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

Moreover configurable functional splits enable dynamic adaptation to various use cases and operational scenarios. Factors considered in determining how/when to implement such options can include: (i) QoS requirements for offered services (e.g. low latency, high throughput); (ii) support of requirements for user density and load demand per given geographical area (which may affect RAN coordination);

(iii) availability of transport and backhaul networks with different performance levels; (iv) application type (e.g. real-time or non-real time); (v) feature requirements at the Radio Network level (e.g. Carrier Aggregation).

Figure 6A:
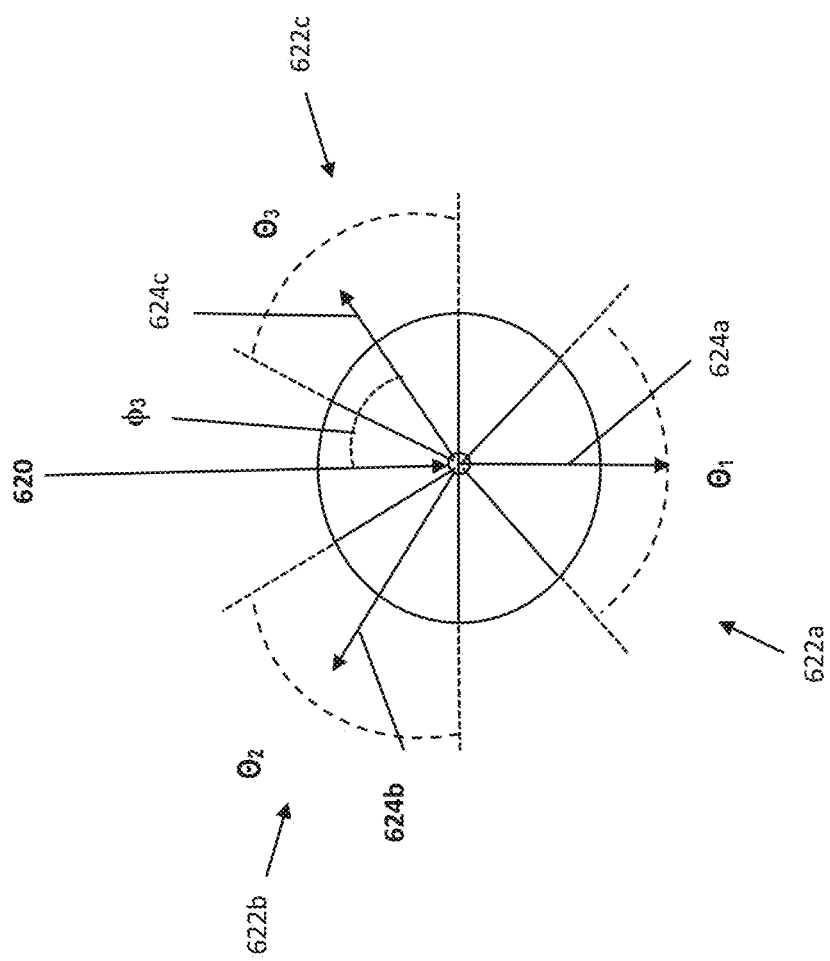
FIG. 6A is a plan view of one exemplary embodiment of a sectorized antenna apparatus according to the present disclosure.

FIG. 6A is a plan view of one exemplary embodiment of a sectorized antenna apparatus useful with various aspects of the present disclosure. As shown, the apparatus 620 includes a plurality of sectors 622a-c each with a corresponding radiator element with azimuth angle of coverage (θn), with a central axis or lobe vector 624a-c associated therewith, each lobe axis 624a-c disposed at a polar angle of ϕ$_n$. It will be appreciated that, as exemplified by the various examples described below with respect to FIGS. 6B-6D: (i) the number of sectors can be varied; (ii) the azimuth coverage of each sector may be varied and/or non-uniform across the sectors; (iii) the polar angle of each center axis may be varied and/or non-uniform across the sectors; (iv) The EIRP or radiated power of each sector may be varied and/or non-uniform across the sectors; (v) the shape of the lobe for each sector may be varied and/or non-uniform across the sectors; (vi) the frequency/carrier assignments of each lobe may be varied and/or non-uniform across the sectors; (vii) intra-sector (lobe) spatial diversity may be used (e.g., a given sector can utilize two sub-elements for spatial diversity purposes) and/or non-uniform across the sectors; and (viii) inter-sector (lobe) spatial diversity may be used; e.g., two or more sectors can be utilized for spatial diversity purposes, such as for beamforming, increased coverage via allocation of redundant data streams to multiple sectors, or increased throughput via allocation of two or more different data streams to respective different sectors.

Figure 6B:
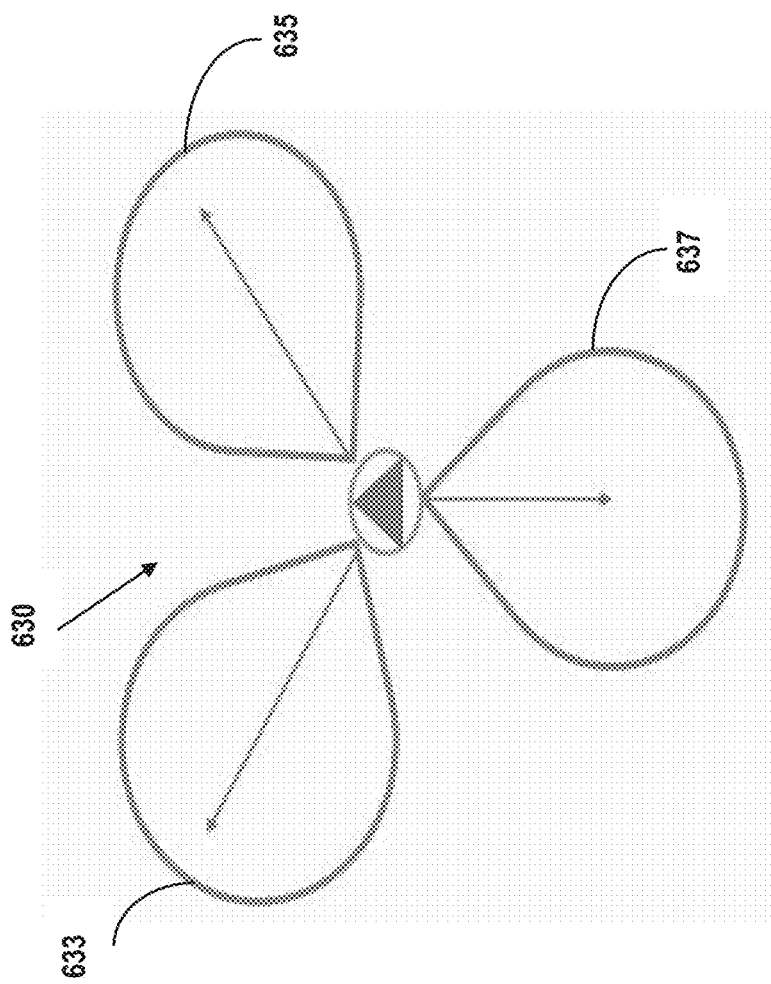
FIG. 6B is a graphical illustration of a first exemplary implementation of the sectorized antenna apparatus of FIG. 6A, showing the radiation lobes thereof.

FIG. 6B is a graphical illustration of an exemplary implementation of the sectorized antenna apparatus of FIG. 6A, showing the radiation lobes thereof. In this embodiment, a tri-point star configuration using a 3 sector antenna with 3 lobes in a CBRS-based wireless system is shown. In one scenario, the (diagrammatically) lower antenna lobe 637 would cover the inside of a building such as within a store in a dense urban area. The two other lobes 633, 635 would provide coverage outside the building. In one such configuration, antenna apparatus 630 can be mounted by a window or door (or some other at least partly transmissive medium) at an optimal height. One configuration utilizes 65 degree horizontal beam-width for the upper two lobes 633, 635, and 90 degree beam-width for the lower lobe 637. This configuration provides better outdoor area coverage due to higher gain and directionality. It also ostensibly allows for better interference profile compared with omni-directional antennas that radiate power equally in all directions, since off-axis interference sources would contribute less to the total interference experienced by each lobe. Stated differently, transmitting only in directions needed with multiple sectors would reduce interference with other CBSDs. In addition, use of more frequency channels reduces interference (inside as well as outside of the premises) because the various sectors/chains are transmitting on different RF channels.

In one exemplary embodiment, the base station apparatus 400 described previously herein with respect to FIGS. 4-4D may utilize reconfigurable antenna elements would allow for inter alia, individual change of azimuth, polar angle, and element tilt. For instance, in one variant, each element is mounted on a two-axis (degree of freedom) mount such that it can be rotated in the azimuth plane (ϕ) as well as in a vertical dimension. Change in azimuth coverage (θ) can be provided using any number of means, such as e.g., use of different size/shape antenna elements or waveguides.

Furthermore, the unit may be adjusted vertically (height) via e.g., an attached extensible stand, or placement on a wall-mounted bracket or tray, or even suspended from or mounted to an overhead such as a ceiling.

Figure 6C:
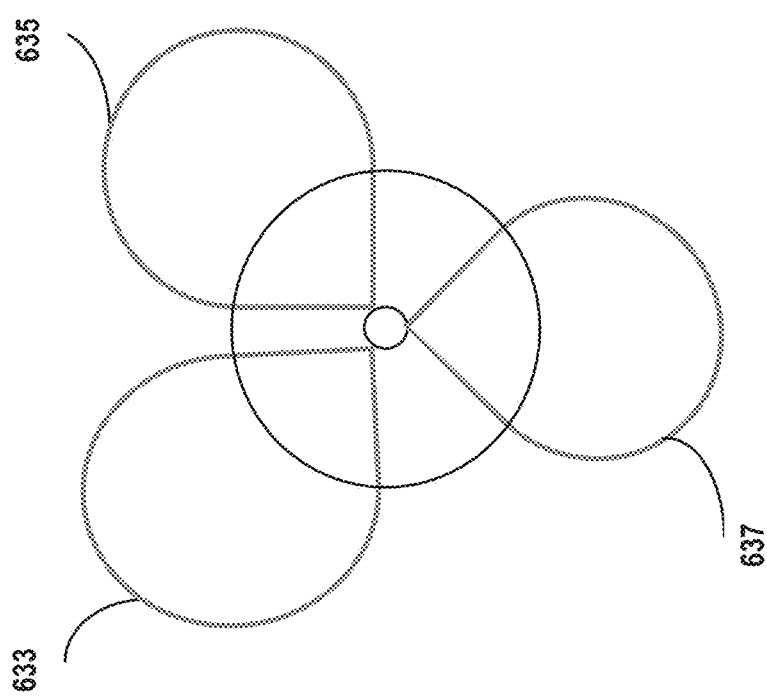
FIG. 6C is a graphical illustration of the sectorized antenna apparatus of FIG. 6A, showing the radiation lobes thereof relative to a comparable omni-directional antenna of the same aggregate EIRP value.

FIG. 6C is a graphical illustration of the sectorized antenna apparatus of FIG. 6A, showing the radiation lobes thereof relative to a comparable omni-directional antenna profile 640 of the same aggregate EIRP value. As shown, since power is radiated only (primarily) within the three lobes shown, greater lobe coverage (radius) is achieved for the same total EIRP for the apparatus 400. Moreover, in one embodiment, each of the RF front end(s) associated with each of the lobes is tuned such that the EIRP of each sector (lobes) does not exceed the mandated 1 W for Category A devices, thereby avoiding professional installation and other associated restrictions (i.e., a user or customer can feasibly install in their premises).

Figure 6D:
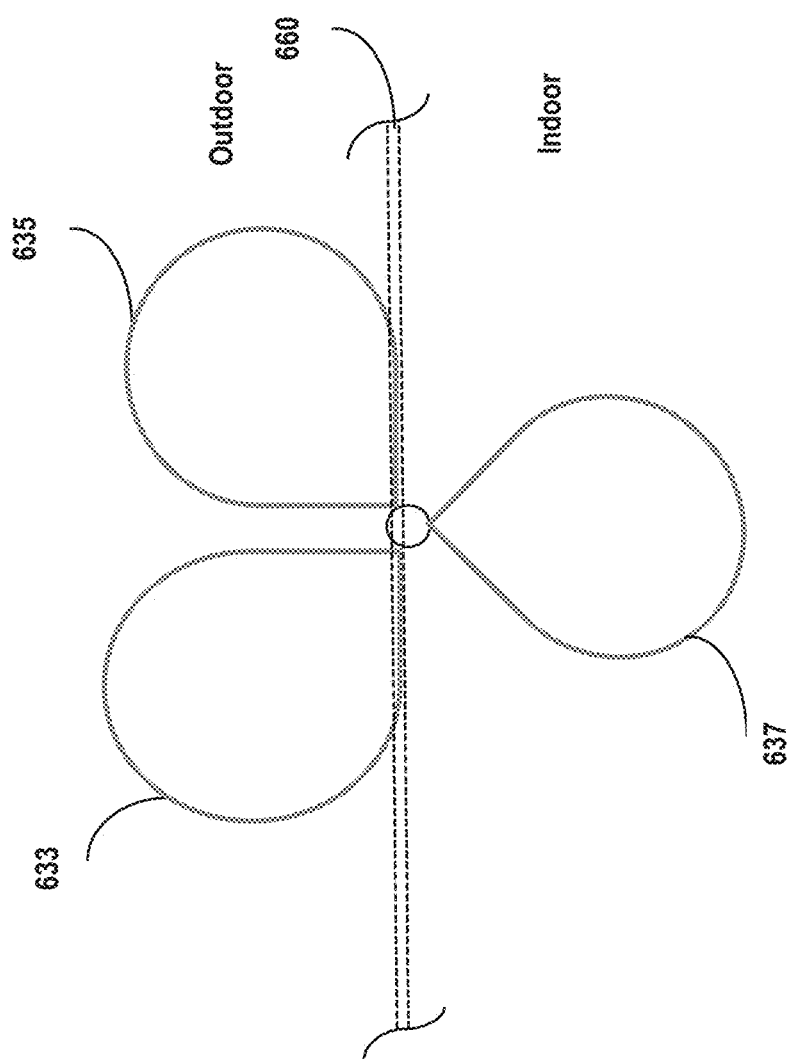
FIG. 6D is a graphical illustration of a second exemplary implementation of the sectorized antenna apparatus of FIG. 6A, showing the radiation lobes thereof relative to an extant structure (e.g., wall).

FIG. 6D is a graphical illustration of a second exemplary implementation of the sectorized antenna apparatus of FIG. 6A, showing the radiation lobes thereof relative to an extant structure (e.g., wall) 660 punctuating indoor and outdoor areas of the premises. In this implementation, the two "outdoor" sectors 633, 635 are adjusted in polar angle (d)) so as to provide maximal outdoor coverage without interference relative to the wall 660.

In one implementation, the GAA spectrum maybe allocated to indoor lobe 637, while PAL spectrum maybe allocated to outdoor lobes 633, 635.

Methods—

Figure 7:
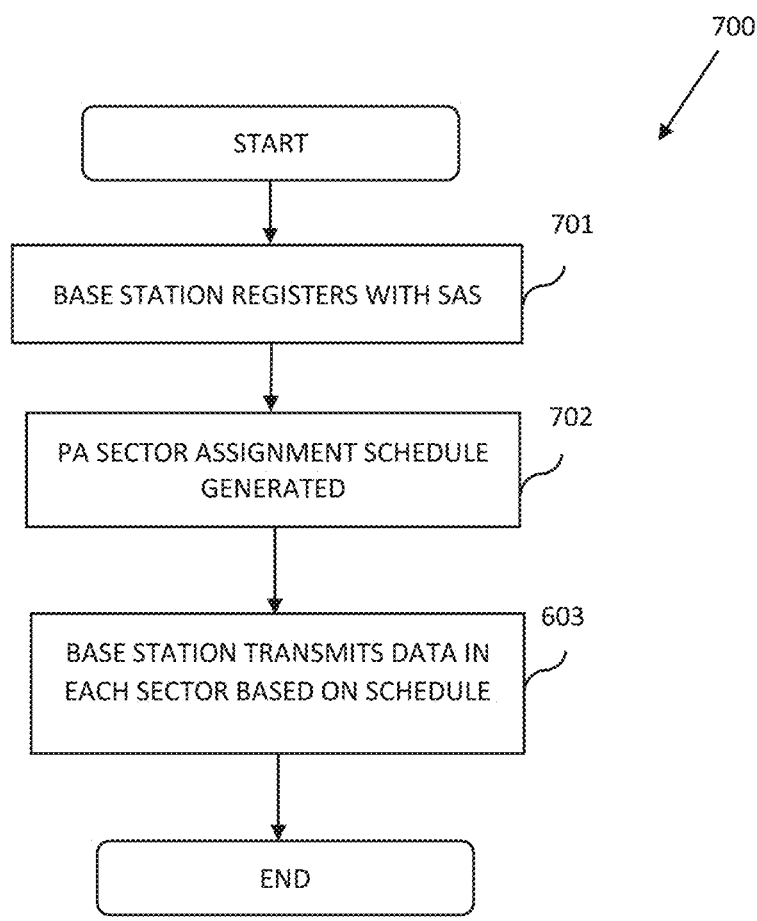
FIG. 7 is a logical flow diagram illustrating a general methodology for scheduling one PA between antenna sectors.
Figure 8:
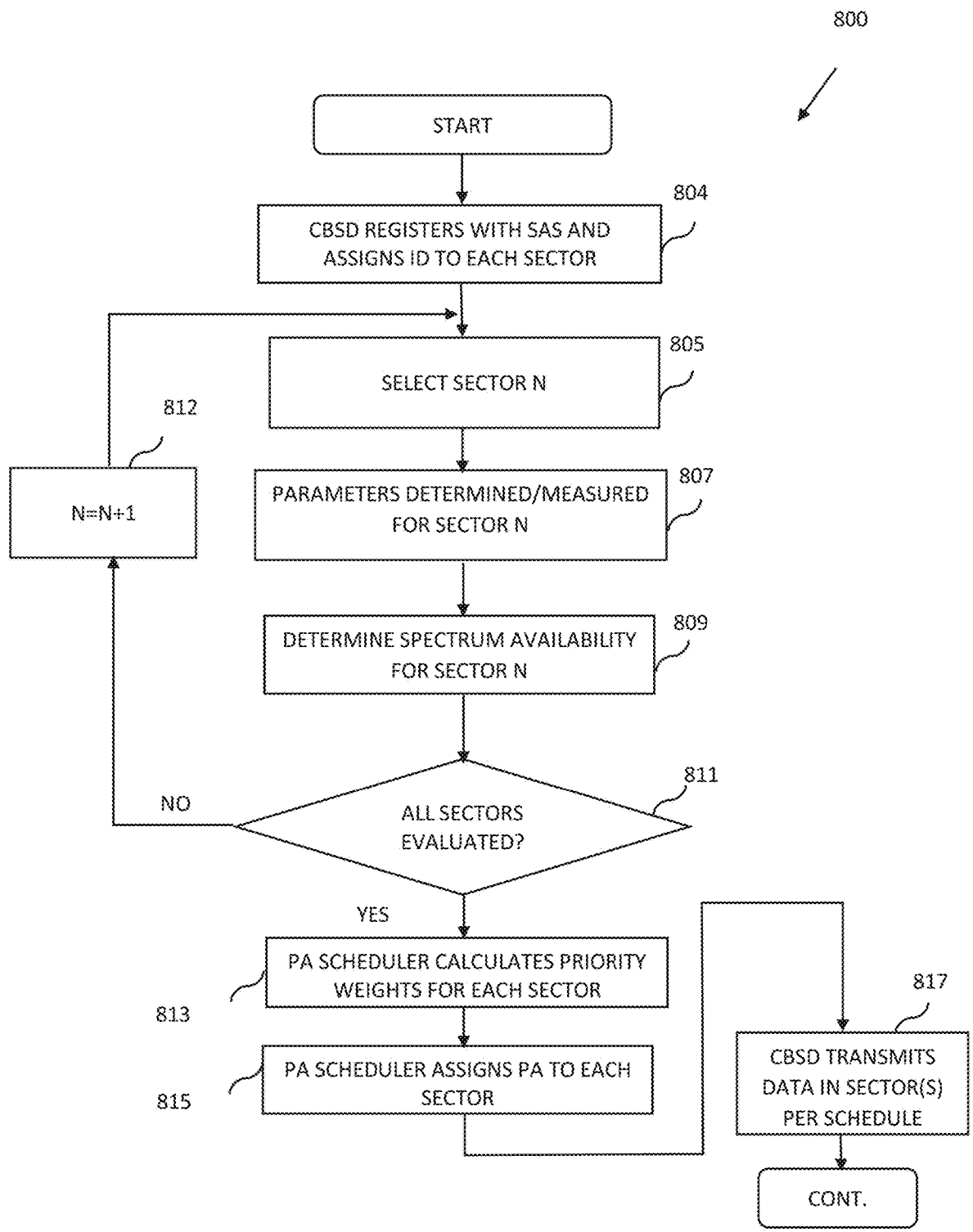
FIG. 8 is a logical flow diagram illustrating an exemplary implementation of the generalized method of FIG. 8 for scheduling one PA between antenna sectors.
Figure 8A:
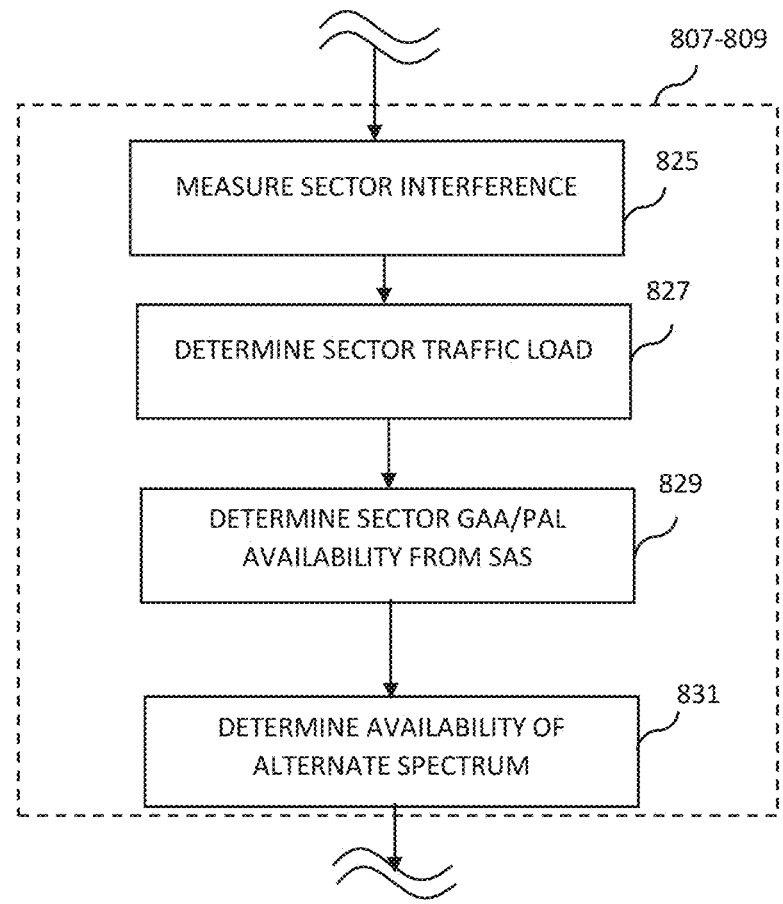
FIG. 8A is a logical flow diagram illustrating a specific implementation of the method of FIG. 8.
Figure 8B:
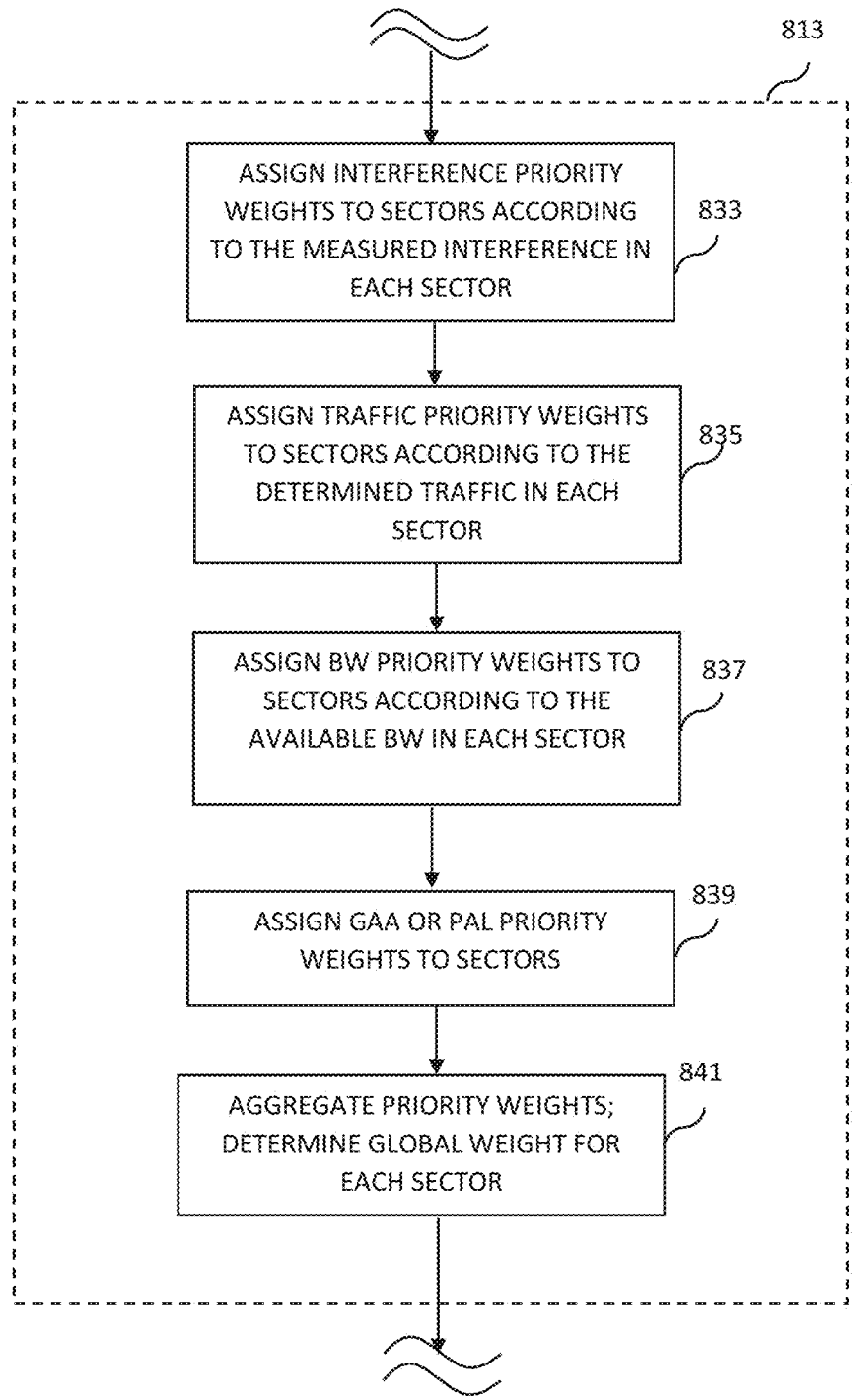
FIG. 8B is a logical flow diagram illustrating another specific implementation of the method of FIG. 8.

Various methods and embodiments thereof for providing unlicensed/quasi-licensed (e.g., CBRS GAA and PAL) coverage according to the present disclosure are now described with respect to FIGS. 7-8B.

Referring now to FIG. 7, one embodiment of the general methodology 700 of sharing PA apparatus (e.g., one PA) is now shown and described. It will be appreciated that while described in the exemplary context of a tri-point configurable CBSD/xNB to drive antenna sectors in the exemplary context of a CBRS-based system with SAS, CBSD/xNB s 400, as previously described, the methodologies described below may be readily adapted by those of ordinary skill to other applications.

Moreover, while the method(s) below are described in the context of a single PA being shared by multiple sectors, it will be noted that a given base station may include two or more PA devices, each being "shared" according to the methodologies below.

At step 701 of method 700, CBSD/xNB powers up and registers to the cognizant spectrum allocation entity (e.g., CBRS SAS).

Per step 702, the BS (and/or network-based if applicable) scheduling logic 435 generates a schedule for assignment of the PA to the various sectors of the base station 400. Based on the schedule, the relevant PA is assigned to different antenna sectors in a time division multiplexing scheme in one approach previously described. The time allocated to each sector depends on the sector reported parameters such as user traffic, interference, available bandwidth, and GAA/PAL spectrum availability, as will be described in detail herein.

Per step 703, the base station (e.g., CBSD/xNB) transmits data at each antenna sector at the specified time(s) assigned for each sector, such as to one or more UE or FWA apparatus located in that sector.

Referring now to FIG. 8, one implementation of the generalized method 700 of FIG. 7 is shown and described.

At step 804 of method 800, the base station (CBSD/xNB) powers up and registers to the cognizant SAS. As part of this registration, a unique ID is assigned to each sector, and each sector is registered with the SAS in effect as its own "emitter." Herein lies one significant feature of the methodology; since the SAS can manage entities as far as spectrum allocation and interference individually, the individual sectors of a given base station 400 are effectively logically "divorced" from each other, with the scheduler logic utilizing data relevant to their individual operation in order to most effectively schedule use of the common PA. As such, each sector may have a distinct or disparate operational profile, including in the spatial domain (e.g., azimuth covered), in terms of interference being experienced, power used for transmission, type of spectrum used (e.g., GAA or PAL), and so forth.

Returning to FIG. 8, per step 805, a first sector (N) to be scheduled is selected. It will be noted that not every sector may need to be scheduled during every interval or iteration of the methodology; for instance, in the exemplary application of FIG. 6D supra, the "indoor" lobe or sector of the base station may have no GAA or other users during times when the business in which it is installed is closed, and hence no scheduling of that sector is required (and that sector may be put in a "sleep" state by the scheduler 435).

Per step 807, the relevant parameter(s) for the selected sector are measured or determined by the base station (whether directly, through in situ measurement via that sector's antenna, or indirectly such as based on stored data or data received by the base station 400 via its backhaul, such as from another network node or process). These parameters may include e.g., presence and volume of user traffic (e.g., in Mbps or some other metric), interference level or signal strength (e.g., CSI, SINR, or CIR), available (frequency) bandwidth, and GAA/PAL spectrum availability. For instance, in one implementation, logic resident on the base station (e.g., within the scheduler 435) is executed to run a profiling "routine" for the selected sector to aggregate the desired data and store it for subsequent use by the scheduling algorithms discussed in detail subsequently herein.

Per step 809, the availability of spectrum for use by the sectors is determined. For instance, in one variant, the base station, as part of the registration process of step 804, also obtains data from the SAS for the available GAA and/or PAL spectrum (if any) for each registered sector (ID). Again, along the lines of the "divorced transmitter" paradigm, one sector may be able to utilize PAL spectrum within its coverage due to e.g., its availability and no presence of an incumbent (e.g., DoD) asset, or where such use would not interfere with other users unacceptably. Conversely, a second sector of the same BS 400, pointing in a wholly different azimuth/coverage area, may not be able to use PAL, or even GAA, and/or may have one or more very significant interferers nearby (e.g., a higher-powered device operating in the same frequency spectrum).

Hence, the present disclosure contemplates operation wherein each sector may be highly heterogeneous in terms of its operating environment, available spectrum, and other germane factors which might affect the base station's ability to operate a given sector at any given time. This characteristic is key to one underlying consideration of the "common PA" approach of the present disclosure; i.e., when such heterogeneity exits, including when some sectors are effectively block for at least a period of time from operating (or simply have no load/traffic), the prior art approach of dedicating separate (expensive) transmitter chain assets to those sectors results in a "cost under-utilization" and reduced ROI for the operator/deploying entity of such devices. Stated simply, the best ROI and utilization is achieved by implementing the lowest cost device which can perform the required functions, and no more. This effect is magnified when considered at scale; e.g., where an operator such as an MSO or MNO deploys e.g., hundreds of thousands or even millions of single-PA/scheduled small-cell devices such as those described herein. Even an incremental per-cell cost saving on the deployment cost of such devices has appreciable impact on the operator's profitability when multiplied by such numbers.

Per step 811, after collection of the relevant data for the selected (Nth) sector, if remaining sectors need to be profiled, the counter (N) is incremented (step 812), and the process of steps 805-809 repeated for each other sector to be scheduled. It will be recognized that while a serialized approach for sector selection is shown in FIG. 8, such data collection/aggregation mat be performed in parallel where sufficient data collection and processing capability within the BS 400 (or any designated proxy node tasked with collecting processing data) exists. Other approaches such as round-robin or weighted schemes may be used with equal success depending on the particular application.

Returning to FIG. 8, per step 813, the PA scheduler calculates priority weights for each sector based on the measured/assessed parameters. Exemplary embodiments of such calculations are described subsequently herein in greater detail.

Per step 815, the PA scheduler 435 next uses the calculated priority weights of step 813 to determine the time slice/slot lengths which the PA is required to allocate to each sector. In one variant, the slot assignment is in effect directly proportional to the weight assigned; e.g., a "0" relative weight results in zero slots being assigned during a given interval, and a "100%" or maximal relative weight results in assignment of a prescribed maximum number of slots. Such schemes may also be configured to avoid any "starvation" of a given sector; i.e., in cases where multiple sectors are active and require some allocation, the weighting scheme can assure that certain minimal requirements for e.g., maintaining a session and/or wireless channel connection are supported so that the less highly prioritized or weighted sectors are not having to (frequently) re-establish such sessions or channels while waiting for their allocation of the PA.

Per step 817, the CBSD/xNB transmits data for each antenna sectors and at the specified time and according to the specified schedule assigned for that sector.

Referring to FIG. 8A, one particular implementation of step 807 of method 800 with reference to FIG. 8 is shown and described. Specifically, at step 825, the base station measures interference (power) in the designated sector, such as by measuring or determining CSI/SINR or other such parameter for a putative radio channel using e.g., 3GPP prescribed methods.

Next, per step 827, user data traffic associated with the designated sector is determined. For instance, in one embodiment, traffic load in a sector is determined using any combination of data relating to: (i) DL physical resource block (RB) usage; (ii) the number of connected users in a sector (based on e.g., individual UE identifiers); (iii) UL physical RB usage; and/or (iv) the number of scheduler users, although other metrics may be used consistent with the disclosure.

Per step 829, the availability of GAA/PAL spectrum in that sector is determined. As previously described, this may be accomplished by either submitting a new request for the allocated ID of the subject sector to SAS for prospective PAL/GAA availability, or accessing previously obtained data (e.g., at time of sector registration) stored locally or at an accessible network node.

As part of step 829, the relative amount of bandwidth available in each of the PAL and/or GAA bands may also be determined. For instance, where PAL spectrum is available, but is insufficient for the determined bandwidth requirements of the user traffic (e.g., only a single, non-aggregated carrier), this information may be used by the scheduler to evaluate whether other available spectrum is better suited to the proposed allocation. For example, while PAL is generally much "cleaner" from an interference standpoint, a highly limited (in terms of available bandwidth) PAL channel may be less desirable for a given application than an effectively unlimited GAA allocation, especially where the measured interference levels for the latter are comparatively low.

Per step 831, the availability of other spectrum which may be used is also optionally determined, such as where there is no PAL or GAA spectrum available for that sector per step 829. For instance, unlicensed spectrum in another band (e.g., non-CBRS 2.4 GHz, C-Band, mmWave, etc.) which is supported by the base station air interfaces may be used as a "fallback" for operation.

Referring to FIG. 8B, one specific implementation of step 813 of the method 800 with reference to FIG. 8 is shown and described.

At step 833, according to one embodiment, a priority weight is assigned to each sector based on measured interference in each sector. In one example, if the measured interferences in three sectors are $I_1$, $I_2$, and $I_3$ respectively, the interference weights $w_1, w_2, w_3$ assigned to sectors are computed as:

$$W_1 = \frac{I_1 \times K}{I_1 + I_2 + I_3} \quad \text{Eqn. (1)}$$

$$W_2 = \frac{I_2 \times K}{I_1 + I_2 + I_3} \quad \text{Eqn. (2)}$$

$$W_3 = \frac{I_3 \times K}{I_1 + I_2 + I_3} \quad \text{Eqn. (3)}$$

where K is a scaling or proportionality constant.

At step 835, according to the measured data traffic in each sector, a priority weight for the traffic is assigned to each sector. In one example, if the measured data traffic in three sectors are $T_1$, $T_2$, and $T_3$ respectively, the weights are assigned to sectors as calculated by:

$$Z_1 = \frac{T_1 \times L}{T_1 + T_2 + T_3} \quad \text{Eqn. (4)}$$

$$Z_2 = \frac{T_2 \times L}{T_1 + T_2 + T_3} \quad \text{Eqn. (5)}$$

$$Z_3 = \frac{T_3 \times L}{T_1 + T_2 + T_3} \quad \text{Eqn. (6)}$$

where L is a proportionality or scaling constant.

At step 837, according to the available spectrum (bandwidth) in each sector reported by e.g., SAS, a priority weight is assigned to each sector. In one example, if the available spectral bandwidth in three sectors are $S_1$, $S_2$, and $S_3$ respectively, the weights are assigned to sectors as follows:

$$X_1 = \frac{S_1 \times M}{S_1 + S_2 + S_3} \quad \text{Eqn. (4)}$$

$$X_2 = \frac{S_2 \times M}{S_1 + S_2 + S_3} \quad \text{Eqn. (5)}$$

$$X_3 = \frac{S_3 \times M}{S_1 + S_2 + S_3} \quad \text{Eqn. (6)}$$

where M is a scaling or proportionality constant.

At step 839, according to availability of GAA/PAL spectrum in each sector reported by the SAS, a "spectrum-type" priority weight is assigned to each sector. In one example, depending on whether PAL or GAA is available in a sector, the priority weight A or B respectively is assigned to that sector (with A>B, in that PAL spectrum traffic in this instance is considered to have higher priority than GAA traffic, based on e.g., higher-tier subscribers having access to PAL, and hence are given a more rich feature set including PA scheduling priority).

At step 841, the weights for each sector are aggregated (e.g., summed or otherwise combined) to produce effective weights, and based on the effective weights, the PA scheduler determines the time slice/slot count or length which the PA is required to allocate to each respective sector within a prescribed allocation period. For instance, where the prescribed period P comprises a duration of 500 ms and slot length 10 ms, Sector 1 may be allocated 30 slots or 300 ms in total, while Sectors 2 and 3 are each allocated lesser amounts (e.g., 150 ms for Sector 2 and 50 ms for Sector 3), based on their relative weightings. For the next period P (500 ms), the scheduler 435 may either (i) utilize the prior schedule assuming no significant changes or based on prior data indicative that the schedule needs to be maintained for a prescribed number of periods in order to e.g., complete a prescribed process such as a HARQ or DTX process), or (ii) generate a new schedule for that period. Obviously, schedule generation/utilization must be completed with sufficient advance such that the PA can be scheduled according to the prevailing schedule for that period P. As such, in one variant, schedules for successive periods are generated or determined by the scheduler at least one period in advance of their actual use.

In the exemplary embodiment, the SAS has knowledge of spectrum usage and transmitters (both GAA and PAL, and incumbent) in a given geographic region, and the antenna sectors ID to which spectrum is assigned. In situations where there is need for revocation of a given channel (e.g., due to incumbent needs), the SAS needs to inform the impacted antenna sectors, and may assign those sectors different spectrum/channels. In these scenarios, the PA scheduler will update the sectors priority weights, and hence the time slice/slot allocation or each sector for a given period P.

It will further be appreciated that a given user device communicative with the base station 400 (e.g., a UE) may transfer from one sector to another, such as by walking from one sector (i.e., indoor) to another (i.e., outdoors) at the served premises, or changing respective azimuth between two outdoor sectors. Accordingly, the present disclosure contemplates such use cases may be handled by, inter alia, inter-sector handover by the CBSD/xNB 400. For instance, in one exemplary method, the moving user moves out of the coverage lobe 237 of the antenna apparatus 620 (see FIG. 6A) and into another lobe. The extant higher layer communication session is maintained for a period of time compatible with the underlying PA schedule generated by the PA scheduler, while a new connection is established. For instance, a user moving their restaurant seat from indoor to outdoor can maintain a common communications session without "dropping." Hence, exemplary configurations of the scheduler 435 can effect transitions from one sector to another (which may also entail different spectrum use, different transmission power, different prioritization and weighting), including in some variants a "honeymoon" period whereby a transitioning UE is afforded its prior sector status to the maximum degree practical, so as to avoid reduced user experience. If degradation or reduction of the connection is required or imminent, that user may be gracefully reduced in service level (e.g., its prioritization weight for the PA scheduler may be maintained for a period of time based on data obtained from its prior sector allocation). In one exemplary implementation, the foregoing sector switching process is a purely "RF-level" process, and there is no messaging between the UE and the base station to perform this transition (as might occur in a traditional handover). This transition is also seamless to user, that is, user should not experience any service interruption during this change.

Additionally, certain scenarios may occur wherein a SAS withdraws a grant for GAA or PAL (or both). In such cases, the exemplary methods and apparatus for effectuating "seamless' frequency reassignment within quasi-licensed networks may be used consistent with the present disclosure (described in co-owned and co-pending U.S. patent application Ser. No. 16/427,186 filed May 30, 2019 entitled "METHODS AND APPARATUS FOR FREQUENCY TRANSITION MANAGEMENT IN A QUASI-LICENSED WIRELESS SYSTEM," and issued as U.S. Pat. No. 10,980,025 on Apr. 13, 2021, which is incorporated herein by reference in its entirety).

Figure 9:
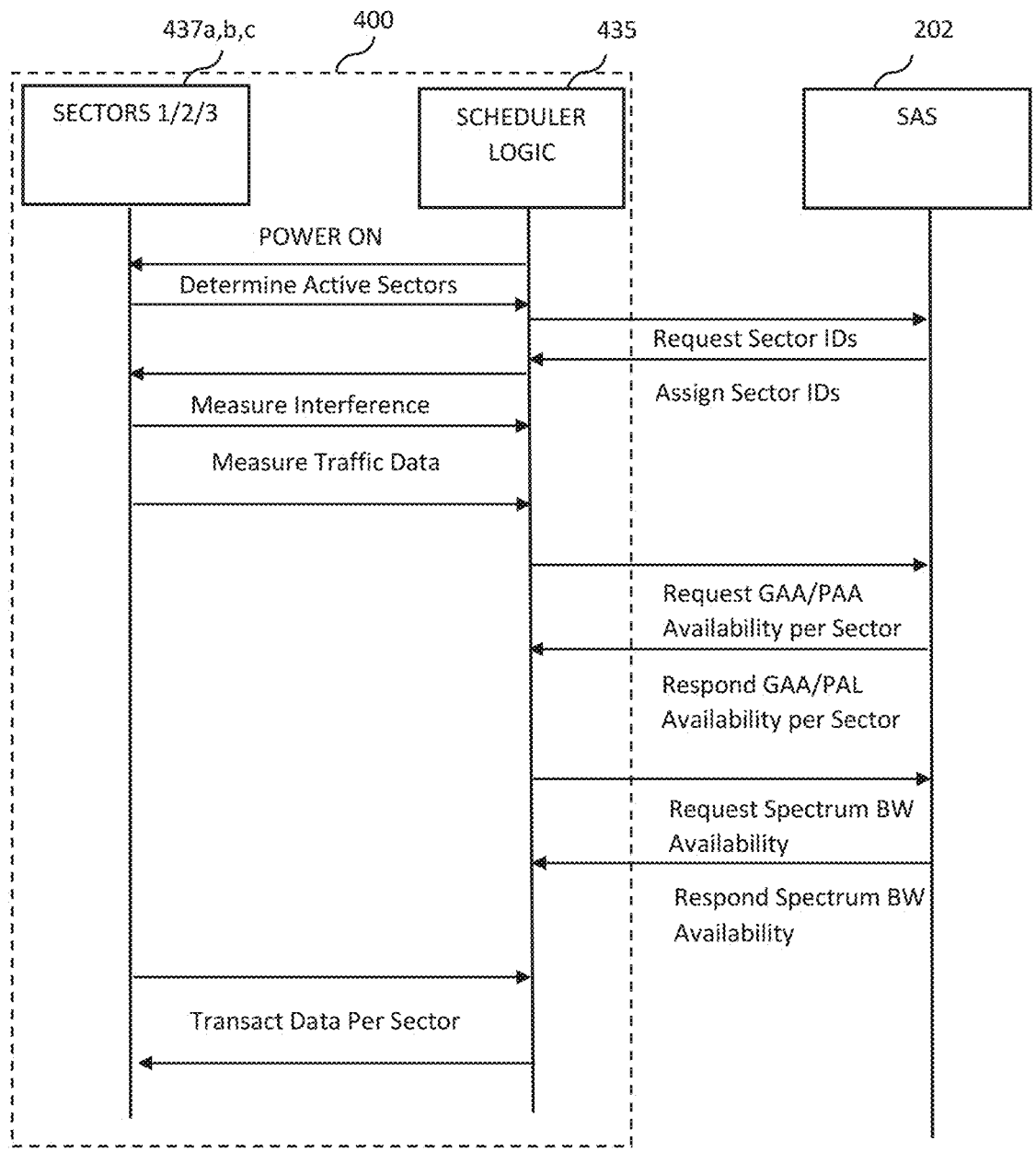
FIG. 9 is a ladder diagram illustrating communication flow between CBSD/xNB, SAS, and antenna sectors.

FIG. 9 is a ladder diagram illustrating the communication flow between individual sectors 437a-c (illustrated as virtualized separate entities in this depiction), the base station scheduler logic 435, and the CBRS SAS 202 according to the disclosure. As illustrated, at power-up, the base station 400 first enumerates its sectors and determines which sectors are available/active. Based thereon, sector IDs are requested for each of the identified sectors from the SAS 202, and the IDs received by the base station are stored e.g., locally in mass storage.

Next, interference, traffic, and available spectrum and bandwidth are determined by the scheduler logic 435 (and other logic processes under its control).

Finally, based on the received data and the generated weights (FIG. 8 above), the schedule is applied to the PA of the base station for transmission of data.

Service Provider Network—

FIG. 10 illustrates an exemplary MSO network architecture for the delivery of packetized data (e.g., encoded digital content or other data carried within a packet or frame structure or protocol) within which the base station apparatus 400 may be used.

It will be appreciated that while described with respect to such network configuration, the methods and apparatus described herein may readily be used with other network types and topologies, whether wired or wireless, managed or unmanaged. Therein further lies another advantage of the inventive base station; i.e., by being commoditized and widely distributable to varying types of customers/subscribers, it can be used in conjunction with a variety of different types of backhauls available at the subscriber's premises to significant effect with a minimum of complexity.

The exemplary service provider network 1000 is used in the embodiment of FIG. 10 to provide backbone and Internet access from the service provider's wireless access nodes (e.g., CBSD/xNBs, Wi-Fi APs, FWA devices or base stations operated or maintained by the MSO), and one or more stand-alone or embedded cable modems (CMs) 1033 in data communication therewith. In the illustrated deployment of FIG. 10, the base stations 400 are configured as CBSD/xNB devices operating using unlicensed/quasi-licensed spectrum, such as to serve customers of a small business concern (e.g., pizza or coffee shop) via their technology-compliant handsets or tablets 1013, or to serve non-business subscribers at e.g., an expansive home or agricultural property. Numerous other applications will be recognized by those of ordinary skill.

The individual CBSD/xNBs 400 are backhauled by the CMs 1033 to the MSO core via e.g., CMTS or CCAP MHAv2/RPD or other such architecture, and the MSO core 1019 includes at least some of the EPC/5GC core functions previously described, as well as an (optional) PA scheduler controller process 1019 as shown. The controller process is one embodiment a network-based server which communicates with the various devices 400 so as to effect various functions including the PA scheduling logic of FIG. 7-8B previously described. As previously referenced, the controller 1019 (which may be e.g., an 5G NR CUe per FIG. 5B) can communicate with the base stations 400 via the primary backhaul (DOCSIS) when operational.

Moreover, the base stations 400 may also communicate with CPE/FWA 1005, or the base stations 400 themselves may assume the role of CPE/FWA, such as where the base station uses e.g., one sector to communicate with a parent or serving CBSD (using e.g., PAL), and other sectors for serving local users/UE via e.g., GAA spectrum. In such cases, client devices 711 such as tablets, smartphones, SmartTVs, etc. at each premises are served by respective WLAN routers 1007, CPE/FWA 1005, or directly by the CBSD/xNB.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

| | | LTE frequency bands - TS 36.101 (Rel. 14 Jun. 2017) | | | |
|---|---|---|---|---|---|
| | | | Downlink (MHz) | | Bandwidth |
| | | Low | Middle EARFCN[1] | High | DL/UL (MHz) |
| Band | Name | | | | |
| 1 | 2100 | 21100 | 2140300 | 2170599 | 60 |
| 2 | 1900 PCS | 1930600 | 1960900 | 19901199 | 60 |
| 3 | 1800+ | 18051200 | 1842.51575 | 18801949 | 75 |
| 4 | AWS-1 | 21101950 | 2132.52175 | 21552399 | 45 |
| 5 | 850 | 8692400 | 881.52525 | 8942649 | 25 |
| 6 | UMTS only | 8752650 | 8802700 | 8852749 | 10 |
| 7 | 2600 | 26202750 | 26553100 | 26903449 | 70 |
| 8 | 900 GSM | 9253450 | 942.53625 | 9603799 | 35 |
| 9 | 1800 | 1844.93800 | 1862.43975 | 1879.94149 | 35 |
| 10 | AWS-1+ | 21104150 | 21404450 | 21704749 | 60 |
| 11 | 1500 Lower | 1475.94750 | 1485.94850 | 1495.94949 | 20 |
| 12 | 700 a | 7295010 | 737.55095 | 7465179 | 17 |
| 13 | 700 c | 7465180 | 7515230 | 7565279 | 10 |
| 14 | 700 PS | 7585280 | 7635330 | 7685379 | 10 |
| 17 | 700 b | 7345730 | 7405790 | 7465849 | 12 |
| 18 | 800 Lower | 8605850 | 867.55925 | 8755999 | 15 |
| 19 | 800 Upper | 8756000 | 882.56075 | 8906149 | 15 |
| 20 | 800 DD | 7916150 | 8066300 | 8216449 | 30 |
| 21 | 1500 Upper | 1495.96450 | 1503.46525 | 1510.96599 | 15 |
| 22 | 3500 | 35106600 | 35507000 | 35907399 | 80 |
| 23 | 2000 S-band | 21807500 | 21907600 | 22007699 | 20 |
| 24 | 1600 L-band | 15257700 | 15427870 | 15598039 | 34 |
| 25 | 1900+ | 19308040 | 1962.58365 | 19958689 | 65 |
| 26 | 850+ | 8598690 | 876.58865 | 8949039 | 35 |
| 27 | 800 SMR | 8529040 | 860.59125 | 8699209 | 17 |
| 28 | 700 APT | 7589210 | 780.59435 | 8039659 | 45 |
| 29 | 700 d | 7179660 | 722.59715 | 7289769 | 11 |
| 30 | 2300 WCS | 23509770 | 23559820 | 23609869 | 10 |
| 31 | 450 | 462.59870 | 4659895 | 467.59919 | 5 |
| 32 | 1500 L-band | 14529920 | 147410140 | 149610359 | 44 |
| 65 | 2100+ | 211065536 | 215565986 | 220066435 | 90 |
| 66 | AWS-3 | 211066436 | 215566886 | 220067335 | 90/70 |
| 67 | 700 EU | 73867336 | 74867436 | 75867535 | 20 |
| 68 | 700 ME | 75367536 | 76867686 | 78367835 | 30 |
| 69 | 2500 | 257067836 | 259568086 | 262068335 | 50 |
| 70 | AWS-4 | 199568336 | 2007.568461 | 202068585 | 25/15 |
| 252 | Unlicensed NII-1 | 5150255144 | 5200255644 | 5250256143 | 100 |
| 255 | Unlicensed NII-3 | 5725260894 | 5787.5261519 | 5850262143 | 125 |
| | | | TDD | | |
| 33 | TD 1900 | 190036000 | 191036100 | 192036199 | 20 |
| 34 | TD 2000 | 201036200 | 2017.536275 | 202536349 | 15 |
| 35 | TD PCS Lower | 185036350 | 188036650 | 191036949 | 60 |
| 36 | TD PCS Upper | 193036950 | 196037250 | 199037549 | 60 |
| 37 | TD PCS Center gap | 191037550 | 192037650 | 193037749 | 20 |
| 38 | TD 2600 | 257037750 | 259538000 | 262038249 | 50 |
| 39 | TD 1900+ | 188038250 | 190038450 | 192038649 | 40 |
| 40 | TD 2300 | 230038650 | 235039150 | 240039649 | 100 |
| 41 | TD 2500 | 249639650 | 259340620 | 269041589 | 194 |
| 42 | TD 3500 | 340041590 | 350042590 | 360043589 | 200 |
| 43 | TD 3700 | 360043590 | 370044590 | 380045589 | 200 |
| 44 | TD 700 | 70345590 | 75346090 | 80346589 | 100 |
| 45 | TD 1500 | 144746590 | 145746690 | 146746789 | 20 |
| 46 | TD Unlicensed | 515046790 | 5537.550665 | 592554539 | 775 |
| 47 | TD V2X | 585554540 | 589054890 | 592555239 | 70 |
| 48 | TD 3600 | 355055240 | 362555990 | 370056739 | 150 |

| | Uplink (MHz) | | | Duplex | Equivalent |
|---|---|---|---|---|---|
| | Low | Middle EARFCN | High | spacing (MHz) | UMTS band |
| Band | | | | | |
| 1 | 192018000 | 195018300 | 198018599 | 190 | 1 |
| 2 | 185018600 | 188018900 | 191019199 | 80 | 2 |
| 3 | 171019200 | 1747.519575 | 178519949 | 95 | 3 |
| 4 | 171019950 | 1732.520175 | 175520399 | 400 | 4 |
| 5 | 82420400 | 836.520525 | 84920649 | 45 | 5 |
| 6 | 83020650 | 83520700 | 84020749 | 45 | 6 |
| 7 | 250020750 | 253521100 | 257021449 | 120 | 7 |
| 8 | 88021450 | 897.521625 | 91521799 | 45 | 8 |
| 9 | 1749.921800 | 1767.421975 | 1784.922149 | 95 | 9 |
| 10 | 171022150 | 174422450 | 177022749 | 400 | 10 |
| 11 | 1427.922750 | 1437.922850 | 1447.922949 | 48 | 11 |

APPENDIX I-continued

LTE frequency bands - TS 36.101 (Rel. 14 Jun. 2017)

| | | | | | |
|---|---|---|---|---|---|
| 12 | 69923010 | 707.523095 | 71623179 | 30 | 12 |
| 13 | 77723180 | 78223230 | 78723279 | −31 | 13 |
| 14 | 78823280 | 79323330 | 79823379 | −30 | 14 |
| 17 | 70423730 | 71023790 | 71623849 | 30 | |
| 18 | 81523850 | 822.523925 | 83023999 | 45 | |
| 19 | 83024000 | 837.524075 | 84524149 | 45 | 19 |
| 20 | 83224150 | 84724300 | 86224449 | −41 | 20 |
| 21 | 1447.924450 | 1455.424525 | 1462.924599 | 48 | 21 |
| 22 | 341024600 | 345025000 | 349025399 | 100 | 22 |
| 23 | 200025500 | 201025600 | 202025699 | 180 | |
| 24 | 1626.525700 | 1643.525870 | 1660.526039 | −101.5 | |
| 25 | 185026040 | 1882.526365 | 191526689 | 80 | 25 |
| 26 | 81426690 | 831.526865 | 84927039 | 45 | 26 |
| 27 | 80727040 | 815.527125 | 82427209 | 45 | |
| 28 | 70327210 | 725.527435 | 74827659 | 55 | |
| 29 | | Downlink only | | | |
| 30 | 230527660 | 231027710 | 231527759 | 45 | |
| 31 | 452.527760 | 45527785 | 457.527809 | 10 | |
| 32 | | Downlink only | | | 32 |
| 65 | 1920131072 | 1965131522 | 2010131971 | 190 | |
| 66 | 1710131972 | 1745132322 | 1780132671 | 400 | |
| 67 | | Downlink only | | | |
| 68 | 698132672 | 713132822 | 728132971 | 55 | |
| 69 | | Downlink only | | | |
| 70 | 1695132972 | 1702.5133047 | 1710133121 | 300 | |
| 252 | | Downlink only | | | |
| 255 | | Downlink only | | | |
| | | TDD | | | |
| 33 | | | | | A(lo) |
| 34 | | | | | A(hi) |
| 35 | | | | | B(lo) |
| 36 | | | | | B(hi) |
| 37 | | | | | C |
| 38 | | | | | D |
| 39 | | | | | F |
| 40 | | | | | E |
| 41 | | | | | |
| 42 | | | | | |
| 43 | | | | | |
| 44 | | | | | |
| 45 | | | | | |
| 46 | | | | | |
| 47 | | | | | |
| 48 | | | | | |

[1]EUTRA Absolute RF Channel Number

What is claimed is:

1. Wireless access point apparatus, comprising:
digital processor apparatus;
antenna apparatus having a plurality of individual antenna elements associated with respective ones of coverage sectors;
at least one wireless transceiver chain in data communication with the digital processor apparatus and the antenna apparatus;
switch apparatus in data communication with the antenna apparatus and the at least one wireless transceiver chain, the switch apparatus operative to switch an output of a power amplifier operatively coupled with the at least one wireless transceiver chain to the plurality of individual antenna elements; and
computer readable apparatus in data communication with the digital processor apparatus and comprising storage medium, the storage medium comprising at least one computer program comprising a plurality of instructions which are configured to, when executed on the digital processor apparatus, cause the switch apparatus to selectively switch the output to one of the plurality of individual antenna elements based at least on a prioritization or weighting scheme.

2. The wireless access point apparatus of claim 1, wherein the selective switch of the output to the one of the plurality of individual antenna elements based at least on a prioritization or weighting scheme comprises selective switching based at least on (i) data indicative of an interference level measured for each of the coverage sectors, and (ii) data indicative of an availability of one or more prescribed types or classes of quasi-licensed radio frequency (RF) spectrum.

3. The wireless access point apparatus of claim 1, wherein the prioritization or weighting scheme comprises at least one interference weight value, and at least one spectrum availability eight value.

4. The wireless access point apparatus of claim 1, wherein the selective switch of the output to the one of the plurality of individual antenna elements based at least on a prioritization or weighting scheme comprises selective switching according to a time-division model, a duration of a temporal period for which the output is switched to the one of the plurality of individual antenna elements based at least in part on the prioritization or weighting scheme.

5. The wireless access point apparatus of claim 1, wherein the selective switch of the output to the one of the plurality of individual antenna elements based at least on a prioritization or weighting scheme comprises selective switching according to a time-division model, a sequence within which the output is switched to the one of the plurality of individual antenna elements relative to others of the plurality of individual antenna elements based at least in part on the prioritization or weighting scheme.

6. The wireless access point apparatus of claim 1, wherein the switch apparatus comprises a programmable logic device enabling reconfiguration of at least one switching matrix associated with the switch apparatus, the reconfiguration enabling implementation of at least one change to connectivity options for the output of the power amplifier to the plurality of individual antenna elements.

7. The wireless access point apparatus of claim 1, wherein the wireless access point apparatus comprises a 3rd Generation Partnership Project (3GPP) 5G NR (Fifth Generation New Radio) gNodeB apparatus having a controller unit (CU) and at least one distributed unit (DU), the digital processor apparatus and the computer readable apparatus in data communication with the digital processor apparatus each associated with the CU, the CU and the at least one DU disposed at separate physical locations from one another.

8. The wireless access point apparatus of claim 1, wherein the plurality of instructions are further configured to, when executed on the digital processor apparatus, cause the switch apparatus to:
generate and transmit a message to a network computerized process in data communication with the wireless access point apparatus to cause obtainment of one or more grants to use RF spectrum of a first type or of a second, different type, the first type and second type having different respective priorities or weights within the prioritization or weighting scheme.

9. The wireless access point apparatus of claim 1, wherein the wireless access point apparatus comprises a Category A Citizens Broadband Radio Service Device (CBSD) which operates at or below 1 Watt.

10. The wireless access point apparatus of claim 1, wherein the plurality of instructions are further configured to, when executed on the digital processor apparatus, cause the switch apparatus to:
receive data representative of a protocol message from a computerized network node, the data representative of the protocol message comprising an information element (IE) directed to the wireless access point apparatus and indicative of at least one of Citizens Broadband Radio Service (CBRS) priority access license (PAL) availability or general authorized access (GAA) availability in the respective ones of the coverage sectors, the data representative of the protocol message configured to cause the wireless access point apparatus to preform the selective switch of the output to one of the plurality of individual antenna elements based at least on the prioritization or weighting scheme, the selective switch comprises a selection of an RF carrier for one of the respective ones of the coverage sectors.

11. A method of operating a multi-sector wireless base station, the method comprising:
determining an interference level associated with at least two of a plurality of radio frequency (RF) coverage sectors of the multi-sector wireless base station;
determining at least one type of RF spectrum available for use by respective ones of the at least two of the plurality of RF coverage sectors of the multi-sector wireless base station;
based at least on the respective determined interference levels and the respective determined at least one type of RF spectrum, determining a prioritization or weighting scheme; and
cause a switch apparatus of the multi-sector wireless base station to selectively switch, based at least on the prioritization or weighting scheme, an output of a power amplifier apparatus to one of at least two antenna elements of the switch apparatus, the at least two antenna elements respectively associated with the at least two of the plurality of RF coverage sectors.

12. The method of claim 11, wherein:
the selective switch of the output of the power amplifier apparatus to the one of the at least two antenna elements of the switch apparatus based at least on the prioritization or weighting scheme comprises selective allocation of the power amplifier apparatus to the respective ones of the plurality of RF coverage sectors.

13. The method of claim 11, wherein:
the determining of the interference level associated with the at least two of the plurality of RF coverage sectors of the multi-sector wireless base station comprises using extant 3rd Generation Partnership Project (3GPP) interference measurement protocols to measure the respective interference levels of the at least two of the plurality of RF coverage sectors; and
the determining of the at least one type of RF spectrum available for use by the at least two of the plurality of RF coverage sectors of the multi-sector wireless base station comprises causing access to a network spectrum allocation process via a communication backhaul of the multi-sector wireless base station.

14. The method of claim 13, wherein the causing of the access to the network spectrum allocation process via the communication backhaul of the multi-sector wireless base station comprises causing access to a Citizens Broadband Radio Service (CBRS) spectrum allocation system (SAS) via a backhaul infrastructure of a managed hybrid fiber coaxial cable network.

15. The method of claim 11, wherein the determining of the prioritization or weighting scheme comprises:
generating a first plurality of weights, respective ones of the first plurality of weights associated with respective ones of the at least two of the plurality of RF coverage sectors and based at least in part on the respective determined interference levels;
generating a second plurality of weights, respective ones of the second plurality of weights associated with respective ones of the at least two of the plurality of RF coverage sectors and based at least in part on the respective determined at least one spectrum type;
aggregating at least a portion of the first plurality of weights with at least a portion of the second plurality of weights to form an aggregated weight for each of the at least two of the plurality of RF coverage sectors; and
using the aggregated weights for the at least two of the plurality of RF coverage sectors for the determining of the prioritization or weighting scheme.

16. Computer readable apparatus comprising a non-transitory storage medium, the non-transitory storage medium comprising at least one computer program having a plurality of instructions, the plurality of instructions configured to, when executed on a processing apparatus, cause a wireless access point apparatus to:
obtain data relating to one or more parameters respectively associated with a plurality of sector antenna elements of a switch apparatus associated with the wireless access point apparatus, each of the plurality of sector antenna elements configured operate within a prescribed frequency band to provide service to a prescribed geographical area;

based at least on the obtained data relating to the one or more parameters, determine a plurality of respective priority weights for the plurality of sector antenna elements; and based on the plurality of respective priority weights, cause the switch apparatus to selectively switch an output of a power amplification apparatus to one of the plurality of sector antenna elements.

17. The computer readable apparatus of claim 16, wherein the wireless access point apparatus comprises a Category B Citizens Broadband Radio Service Device (CBSD) having a 3rd Generation Partnership Project (3GPP) protocol stack.

18. The computer readable apparatus of claim 16, wherein the plurality of instructions are further configured to, when executed on the processing apparatus, cause the wireless access point apparatus to:

based on the plurality of respective priority weights, generate a utilization schedule for use of the power amplification apparatus; and generate at least one control input for controlling at least the switch apparatus according to the generated utilization schedule, the at least one control input configured to cause the switch apparatus to perform the selective switch of the output of the power amplification apparatus to the one of the plurality of sector antenna elements.

19. The computer readable apparatus of claim 18, wherein the utilization schedule comprises a time-division based schedule, the time-division based schedule comprising pluralities of allocable time slots within respective ones of at least one of (i) time periods or (ii) frames, the pluralities of allocable time slots each being separately allocable to different ones of the plurality of sector antenna elements.

20. The computer readable apparatus of claim 16, wherein the data relating to the one or more parameters comprises data relating to (i) radio frequency (RF) interference levels associated with respective ones of azimuth sectors of the plurality of sector antenna elements;

and (ii) quasi-licensed spectrum available for use by the respective ones of the azimuth sectors of the plurality of sector antenna elements for transmitting signals output from the power amplification apparatus.

* * * * *